United States Patent
Minami et al.

(10) Patent No.: US 6,770,355 B1
(45) Date of Patent: Aug. 3, 2004

(54) POLYPROPYLENE FILM AND MULTILAYERED LAMINATE

(75) Inventors: Yutaka Minami, Chiba (JP); Masami Kanamaru, Chiba (JP); Hideo Funabashi, Chiba (JP)

(73) Assignee: Idemitsu Petrochemical Co., Ltd., Tokyo (JP)

( * ) Notice: Subject to any disclaimer, the term of this patent is extended or adjusted under 35 U.S.C. 154(b) by 15 days.

(21) Appl. No.: 10/110,204

(22) PCT Filed: Oct. 24, 2000

(86) PCT No.: PCT/JP00/07408
§ 371 (c)(1),
(2), (4) Date: Apr. 17, 2002

(87) PCT Pub. No.: WO01/30890
PCT Pub. Date: Mar. 5, 2001

(30) Foreign Application Priority Data

Oct. 26, 1999 (JP) ............................................. 11-303522
Nov. 18, 1999 (JP) ............................................. 11-327906

(51) Int. Cl.$^7$ ............................... B32B 27/32; C08J 5/18
(52) U.S. Cl. ........................ 428/220; 428/351; 428/352; 428/516; 428/523
(58) Field of Search ................................ 428/219, 220, 428/351, 352, 516, 523; 526/351, 352

(56) References Cited

U.S. PATENT DOCUMENTS 6,562,886 B1 * 5/2003 Minami et al. ............. 524/115

FOREIGN PATENT DOCUMENTS

| JP | 60-55046 | 3/1985 |
| JP | 4-97843 | 3/1992 |
| JP | 7-329260 | 12/1995 |
| JP | 9-151213 | 6/1997 |
| JP | 9-208629 | 8/1997 |
| JP | 11-1584 | 1/1999 |
| JP | 11-060833 | 3/1999 |
| JP | 11-106433 | 4/1999 |
| WO | 99/09098 | 2/1999 |

* cited by examiner

*Primary Examiner*—D. S. Nakarani
(74) *Attorney, Agent, or Firm*—Oblon, Spivak, McClelland, Maier & Neustadt, P.C.

(57) ABSTRACT

The polypropylene film of the present invention satisfies the relationship: $TM \geq 12.5 \times HST-900$, wherein TM is a tensile modulus (MPa) and HST is a heat seal temperature (° C.), and is well-balanced between the tensile modulus and the heat seal temperature, less tacky, and excellent in processability, transparency and impact resistance. The polypropylene film may be produced from a propylene polymer (A) having: (1) a melting point (Tm) of from 120 to 135° C. as measured by differential scanning calorimeter (DSC); (2) a melting endotherm ΔH (J/g) as measured by the DSC, satisfying the following formula: $\Delta H \geq 0.45 \times Tm+22$; (3) a peak top half-width (Th) of 5° C. or lower when measured on an elution curve by temperature rising fractionation; and (4) an intrinsic viscosity [η] of from 1 to 3 dl/g as measured at 135° C. in tetralin. A multilayered polyolefin resin laminate of the present invention comprises at least one outermost layer made of the above polypropylene film, and is well-balanced between a tensile modulus and a heat seal temperature, less tacky and excellent in slipping and anti-blocking properties.

19 Claims, No Drawings

POLYPROPYLENE FILM AND MULTILAYERED LAMINATE

TECHNICAL FIELD

The present invention relates to a novel polypropylene film usable as a substitute for soft vinyl chloride films. More particularly, the present invention relates to a novel polypropylene-based film that is less tacky, well-balanced between a tensile modulus and a heat seal temperature, and excellent in processability, transparency and impact resistance. The present invention further relates to a novel multilayered polyolefin resin laminate, and more particularly, to a novel multilayered polyolefin resin laminate that is well-balanced between a tensile modulus and a heat seal temperature, less tacky, and excellent in slipping and anti-blocking properties necessary for high-speed bag forming.

BACKGROUND ART

Vinyl chloride resins are widely used as soft resin. However, it is known that the vinyl chloride resins generate harmful substances upon burning. For this reason, it has been strongly required to develop a substitute resin. Recently, there have been used, as a substitute resin, olefin polymers produced by using a metallocene catalyst. Example of these olefin polymers include a copolymer of ethylene and α-olefin. However, such a copolymer poses a problem that it becomes too tacky when softened. Further, shaped articles, such as film, produced from the copolymer have poor surface properties because of deteriorated transparency, rigidity and low-temperature heat sealability, thereby rendering it unsatisfactory. The copolymer is also poor in processability.

Crystalline propylene polymer films are widely used as a packaging film owing to their excellent rigidity, transparency and moisture resistance. The crystalline propylene polymer films may be used alone as monolayered films, or in combination with films of ethylene-vinyl acetate copolymer, linear polyethylene or the like as multilayered laminate films. For their use, the packaging films are often processed into bags, regardless of whether the films are monolayered or multilayered. A series of processes for forming a film into a bag and closing the opening of the bag after putting contents therein is generally carried out by pressing the film edges with a heated rod and melt-welding the edges to each other (so called "heat sealing"). Recently, it has been required to speed up the bag-forming and packaging processes for increased productivity, which results in great demands for materials with good heat sealability. Also, it has been required for the film to inevitably have slipping and anti-blocking properties so that the above fabrication process can be efficiently made. It has been known that a multilayered laminate fails to show a sufficient interlaminar strength when produced without using an adhesive and the like. It is therefore necessary to adhere layers of a laminate by using the adhesive in order to impart excellent properties of low-temperature heat sealability, rigidity, transparency, moisture resistance and the like to the multilayered laminates.

DISCLOSURE OF THE INVENTION

Thus, a first object of the present invention is to provide a polypropylene film that is less tacky, well-balanced between a tensile modulus and a heat seal temperature, and excellent in processability, transparency and impact resistance. A second object of the present invention is to provide a multilayered polyolefin resin laminate that is well-balanced between a tensile modulus and a heat seal temperature, less tacky, and excellent in slipping and anti-blocking properties necessary for high-speed bag forming.

As a result of extensive research, the inventors have found that the above objects are achieved by a polypropylene film satisfying a specific relationship between a tensile modulus TM (MPa) and a heat seal temperature HST (° C.). The inventors have further found that the above object is achieved by a multilayered polyolefin resin laminate in which at least one outermost layer is made of the above polypropylene film. The present invention has been accomplished based on these findings.

Thus, according to a first aspect of the present invention, there is provided a polypropylene film satisfying the following formula:

$$TM \geq 12.5 \times HST - 900$$

wherein TM is a tensile modulus (MPa) and HST is a heat seal temperature (° C.).

The above polypropylene film may be produced from a propylene polymer (A) having:
(1) a melting point Tm of from 120 to 135° C. as measured by differential scanning calorimeter (DSC);
(2) a melting endotherm ΔH (J/g) as measured by the DSC, satisfying the following formula:

$$\Delta H \geq 0.45 \times Tm + 22;$$

(3) a half-width Th (° C.) of the peak top of an elution curve as measured by temperature rising fractionation, of 5° C. or lower; and
(4) an intrinsic viscosity [η] of from 1 to 3 dl/g as measured at 135° C. in tetralin.

As the propylene polymer, preferred is a propylene homopolymer (A-1) satisfying:
(1) a meso pentad fraction [mmmm] of from 70 to 80 mol %; and
(2) a racemic pentad fraction [rrrr] satisfying, together with 1-[mmmm], the following formula:

$$[rrrr]/(1-[mmmm]) \leq 0.1.$$

The propylene polymer (A) and the propylene homopolymer (A-1) are produced by polymerizing propylene, or polymerizing propylene with ethylene and/or $C_4$–$C_{20}$ α-olefin, in the presence of a specific transition metal catalyst.

According to a second aspect of the present invention, there is provided a multilayered polyolefin resin laminate, wherein at least one outermost layer is made of the above polypropylene film. Other laminate layers are preferably produced from a crystalline propylene polymer other than the propylene polymer (A) and the propylene homopolymer (A-1).

BEST MODE FOR CARRYING OUT THE INVENTION

The present invention will be described below in detail.
(I) Polypropylene Film
The polypropylene film of the present invention satisfies the following formula:
TM≧12.5×HST−900, preferably
TM≧12.5×HST−800 and HST≦130, more preferably
TM≧12.5×HST−750 and HST≦130 wherein TM is a tensile modulus (MPa) and HST is a heat seal temperature (° C.). The TM and HST measuring methods are described in detail in Examples below.

The polypropylene film is, as described above, well-balanced between the tensile modulus and the heat seal temperature, i.e., exhibits a high rigidity and an excellent low-temperature heat sealability, so that the film is suitably used as food packaging films, agricultural films (for use in, e.g., a vinyl plastic green house) and sealant films. The polypropylene film incapable of satisfying the above formula fails to be balanced in the tensile modulus and the heat sealability, thereby rendering it unsatisfactory.

Specifically, as the polypropylene film of the present invention, there may be exemplified a film produced from a propylene polymer (A) described below.

(I-1) Propylene Polymer (A)

The propylene polymer (A) has the following characteristics (1) to (4):

(1) a melting point Tm of from 120 to 135° C. as measured by differential scanning calorimeter (DSC);

(2) a melting endotherm $\Delta H$ (J/g) as measured by the DSC, satisfying the following formula:

$$\Delta H \geq 0.45 \times Tm + 22;$$

(3) a half-width Th of the peak top of an elution curve as measured by temperature rising fractionation, of 5° C. or lower; and (4) an intrinsic viscosity $[\eta]$ of from 1 to 3 dl/g as measured at 135° C. in tetralin.

The use of the propylene polymer (A) satisfying the above requirements enables the production of a polypropylene film that is less tacky, well-balanced between the tensile modulus and the heat seal temperature, and excellent in processability, transparency and impact resistance.

Tm and $\Delta H$ are determined by DSC measurement. Namely, by using a differential scanning colorimeter ("DSC-7" available from Perkin-Elmer Corp.), 10 mg of a sample was melted by heating at 230° C. for 3 min in nitrogen atmosphere, and then cooled to 0° C. at a rate of 10° C./min. The cooled sample was allowed to stand at 0° C. for 3 min, and then heated at a temperature rise rate of 10° C./min to obtain a melting endotherm. The peak top of the maximum peak in the melting endotherm curve is the melting point Tm, and the melting endotherm during the melting is $\Delta H$ (J/g). Method for measuring Th and $[\eta]$ are described in detail in Examples below.

The above requirements (1) to (4) will be described in detail.

(1) When the melting point Tm is lower than 120° C., polymer products the tend to be disadvantageously fused to adhere during boiling disinfection in the food packaging and medical applications. Further, when the melting point Tm exceeds 135° C., the polymer tends to be unsatisfactory as a substitute for a soft vinyl chloride resin.

(2) When satisfying the requirement (2), a propylene polymer is well-balanced between the melting point and the melting endotherm and also between low-temperature heat sealability and mechanical strength (e.g., elastic modulus, impact resistance, rigidity). A propylene polymer incapable of satisfying the requirement may fail to show a good balance between processability and/or processability at low temperature and mechanical strength, so that films obtained from the polymer become ill-balanced between low-temperature heat sealability and mechanical strength, thereby rendering it unsatisfactory. The propylene polymer (A) preferably satisfies the following formula:

$$\Delta H \geq 0.45 \times Tm + 25.$$

(3) A polymer satisfying the requirement (3) provides a film having an excellent heat sealability. The half-width (Th) of a main elution peak is preferably 4.0° C. or lower as measured by temperature rising fractionation. When Th exceeds 5° C., the polymer tends to become sticky with unfavorable result of rendering the heat sealability of a resultant film insufficient.

(4) The intrinsic viscosity $[\eta]$ is from 1 to 3 dl/g, preferably from 1 to 2.5 dl/g, more preferably from 1.5 to 2.0 dl/g, as measured at 135° C. in tetralin. When the intrinsic viscosity $[\eta]$ is less than 1 dl/g, the polymer tends to become sticky and makes a resultant film low in mechanical strength. When exceeding 3 dl/g, the processability becomes poor owing to reduced melt flowability.

Further, the propylene polymer (A) preferably has a molecular weight distribution (Mw/Mn) of 2.5 to 4.0, more preferably 2.5 to 3.5, most preferably 2.5 to 3.0 as measured by gel permeation chromatography (GPC). When the molecular weight distribution (Mw/Mn) is less than 2.5, the polymer is deteriorated in processability. When exceeding 4.0, the polymer tends to become sticky. The apparatus and measuring conditions for GPC will be described in Examples below.

In addition, the propylene polymer (A) preferably contains a fraction extractable with boiling diethyl ether, as an index of tackiness, in an amount of 0 to 10% by weight, more preferably 0 to 5% by weight so as to prevent tacky components from bleeding out to the surface of a shaped article.

The tensile modulus of the propylene polymer (A) is preferably from 600 to 1,600 MPa, more preferably from 700 to 1,200 MPa, most preferably 800 to 1,100 MPa.

Being produced from the propylene polymer (A) having a narrow molecular weight distribution (Mw/Mn) and containing a less amount of a fraction extractable with boiling diethyl ether, the polypropylene film is less tacky because of prevention of tacky components from bleeding out to its surface. Further, the polypropylene film is excellent not only in surface properties such as slipping and anti-blocking properties but also in processability because of less tackiness.

The polypropylene film produced from the propylene polymer (A) has an internal haze of usually 5% or less, preferably 3% or less, as determined from its haze value measured according to JIS K-7105, and therefore exhibits excellent transparency. The polypropylene film made of the propylene polymer (A) has an internal haze of 5% or less, preferably 3% or less as determined from its haze value measured according to JIS K-7105, and therefore, exhibits excellent transparency. Also, the polypropylene film has an impact resistance of 10,000 J/m$^2$ or higher, preferably 15,000 J/m$^2$ or higher as measured by a film impact tester available from Toyo Seiki Seisaku-Sho, Co., Ltd. using a ½ inch impact head, and therefore, exhibits an excellent impact resistance.

The propylene polymer (A) may include propylene homopolymers and propylene copolymers of propylene and a small amount of ethylene and/or $C_4$–$C_{20}$ α-olefin, with propylene homopolymers being preferred. Examples of $C_4$–$C_{20}$ α-olefin include 1-butene, 1-pentene, 4-methyl-1-pentene, 1-hexene, 1-octene, 1-decene, 1-dodecene, 1-tetradecene, 1-hexadecene, 1-octadecene, and 1-eicocene. These olefins may be used alone or in combination of two or more.

(I-2) Propylene Homopolymer (A-1)

As the propylene homopolymer, preferred is a propylene homopolymer (A-1) satisfying (1) and (2):

(1) a meso pentad fraction [mmmm] of from 70 to 80 mol %; and (2) a racemic pentad fraction [rrrr] satisfying, together with 1–[mmmm], the following formula:

$$[rrrr]/(1-[mmmm]) \leq 0.1.$$

The meso pentad fraction [mmmm] described herein means a meso fraction in pentad units in polypropylene molecular chain as measured using methyl signals in $^{13}$C-NMR spectra according to the method proposed by A. Zambelli et al., "Macromolecules", 6, 925 (1973). The larger value of the meso pentad fraction means a higher stereoregularity. The meso pentad fraction [mmmm] of the propylene homopolymer (A-1) used in the present invention is preferably 70 to 80 mol %. When less than 70 mol %, the polymer tends to be deteriorated in the tensile modulus and the impact resistance and has a poor processability. When the meso pentad fraction [mmmm] exceeds 80 mol %, the softness is lost and the low-temperature heat sealability is impaired because of increased high heat seal temperature. The racemic pentad fraction [rrrr] means a racemic fraction in pentad units in polypropylene molecular chain. The value of [rrrr]/(1–[mmmm]) is determined from the above fractions in pentad units, and is an index indicating uniformity of the regularity distribution of the propylene homopolymer (A-1). When the value becomes lager, the regularity distribution is broadened to give a polymer comprising a mixture of a high-stereoregular polypropylene and an atactic polypropylene as in the case of a conventional polypropylene produced in the presence of a known catalyst system, thereby causing a film to have an increased tackiness and a reduced transparency. The value of [rrrr]/(1–[mmmm]) of the propylene homopolymer (A-1) used in the present invention is preferably 0.08 or less, more preferably 0.06 or less, most preferably 0.02 or less. When the value of [rrrr]/(1–[mmmm]) exceeds 0.1, the polymer tends to become sticky. The measuring method by $^{13}$C-NMR spectra is described in detail in Examples below.

In general, the polymerization of propylene usually proceeds by so-called 1,2-insertion in which the carbon atom located on the methylene side of a propylene monomer is bonded to the active site of a catalyst and propylene monomers are sequentially coordinated in the same manner to cause polymerization. However, 2,1-insertion or 1,3-insertion (abnormal insertion) rarely occurs. In the propylene homopolymer (A-1) used in the present invention, it is preferred that the 2,1-insertion or 1,3-insertion is minimized. Further, the ratio of these insertions is preferred to satisfy the relationship represented by the following formula (1):

$$[(m\text{-}2,1)+(r\text{-}2,1)+(1,3)] \leq 5.0(\%) \quad (1)$$

wherein (m-2,1) is a content (%) of meso 2,1-insertion as measured by $^{13}$C-NMR; (r-2,1) is a content (%) of racemic 2,1-insertion as measured by $^{13}$C-NMR; and (1,3) is a content (%) of 1,3-insertion as measured by $^{13}$C-NMR, more preferably by the following formula (2):

$$[(m\text{-}2,1)+(r\text{-}2,1)+(1,3)] \leq 1.0(\%) \quad (2), \text{ and}$$

most preferably by the following formula (3):

$$[(m\text{-}2,1)+(r\text{-}2,1)+(1,3)] \leq 0.1(\%) \quad (3).$$

A polymer not satisfying the formula (1) may, in some cases, be deteriorated in crystallinity more than expected to cause tackiness.

The insertion contents (m-2,1), (r-2,1) and (1,3) are calculated from integral intensities of respective peaks of $^{13}$C-NMR spectra which are assigned to the respective insertions according to the method reported in Grassi, et al., "Macromolecules", 21, p. 617 (1988) and Busico, et al., "Macromolecules", 27, p. 7538 (1994). Namely, (m-2,1) is a meso 2,1-insertion content (%) calculated from a ratio of the integral intensity of the Pα,γ threo peak at around 17.2 ppm to the integral intensity of a whole methyl carbon region. The content (r-2,1) is a racemic 2,1-insertion content (%) calculated from a ratio of the integral intensity of the Pα,γ threo peak at around 15.0 ppm to the integral intensity of a whole methyl carbon region. The content (1,3) is a 1,3-insertion content (%) calculated from a ratio of the integral intensity of the Tβ,γ+ peak at around 31.0 ppm to the integral intensity of a whole methyl carbon region.

Further, it is more preferred that the propylene homopolymer (A-1) used in the present invention shows substantially no peak attributable to a molecular chain end derived from the 2,1-insertion (n-butyl) when measured by $^{13}$C-NMR. With respect to the molecular chain end that is derived from the 2,1-insertion, the respective insertion contents are calculated from the integral intensities of peaks of $^{13}$C-NMR spectra which are assigned to the respective insertions according to the method reported in Jungling, et al., "J. Polym. Sci.: Part A: Polym. Chem.", 33, p. 1305 (1995). In case of isotactic polypropylene, the peak appearing near 18.9 ppm is assigned to the end methyl carbon of butyl. $^{13}$C-NMR measurement for determining the abnormal insertion and the molecular chain end is conducted in the same manner as in the measurement of the meso pentad fraction [mmmm] described above.

(I-3) Production of Propylene Polymer (A) and Propylene Homopolymer (A-1)

The propylene polymer (A) and the propylene homopolymer (A-1) are preferably produced using a polymerization catalyst 1 or 2 described below.

(I-3a) Polymerization Catalyst 1

The polymerization catalyst 1 comprises:

(A) a transition metal compound represented by the following general formula (I):

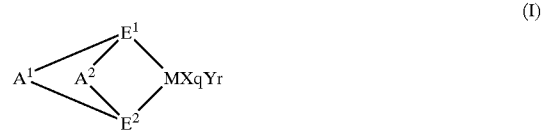

wherein M is a metal element of Groups 3 to 10 or lanthanum series of the Period Table;

$E^1$ and $E^2$ are the same or different and each independently is a ligand selected from the group consisting of substituted cyclopentadienyl, indenyl, substituted indenyl, heterocyclopentadienyl, substituted heterocyclopentadienyl, amido, phosphide, hydrocarbyl and silicon-containing group; and $E^1$ and $E^2$ are cross-linked via $A^1$ and $A^2$;

X is a σ-bonding ligand; and a plurality of X, if any, may be same or different and each X may be cross-linked with another X, $E^1$, $E^2$ or Y;

Y is a Lewis base; and a plurality of Y, if any, may be same or different and each Y may be cross-linked with another Y, $E^1$, $E^2$ or X;

$A^1$ and $A^2$ may be the same or different divalent group for cross-linking two ligands $E^1$ and $E^2$ and each independently is $C_1$–$C_{20}$ hydrocarbyl, $C_1$–$C_{20}$ halogen-containing hydrocarbyl, silicon-containing group, germanium-containing group, tin-containing group, —O—, —CO—, —S—, —SO$_2$—, —Se—, —NR—, —PR—, —P(O)R—, —BR— or —AlR— wherein R is hydrogen, halogen, C$_1$–C$_{20}$ hydrocarbyl or C$_1$–C$_{20}$ halogen-containing hydrocarbyl;

q is an integer of 1 to 5 given by the formula, [(valence of M)–2]; and r is an integer of 0 to 3, and (B) at least one component selected from the group consisting of a compound (B-1) capable of forming an ionic complex by reacting with said transition metal compound (A) or a derivative thereof, and an aluminoxane (B-2).

In the above general formula (I), M represents a metal element belonging to Groups 3 to 10 or lanthanum series of the Period Table. Specific examples of the metal elements include titanium, zirconium, hafnium, yttrium, vanadium, chromium, manganese, nickel, cobalt, palladium and lanthanoid metals. Of these metal elements, preferred are titanium, zirconium and hafnium in view of the activity to olefin polymerization.

E$^1$ and E$^2$ form a cross-linked structure via A$^1$ and A$^2$ and each independently is a ligand selected from the group consisting of substituted cyclopentadienyl, indenyl, substituted indenyl, heterocyclopentadienyl, substituted heterocyclopentadienyl, amido (—N<), phosphide (—P<), π-bonding hydrocarbyl (>CR$^{12}$—, >C<) and silicon-containing group (>SiR$^{12}$—, >Si<) wherein R$^{12}$ is hydrogen, C$_1$–C$_{20}$ hydrocarbyl or hetero atom-containing group. Examples of π-bonding hydrocarbyl (>CR$^{12}$—, >C<) include pentadienyl and boratabenzenyl. Examples of silicon-containing group (>SiR$^{12}$—, >Si<) include —CH$_2$—Si(CH$_3$)< and —Si(CH$_3$)<. The ligands E$^1$ and E$^2$ may be same or different from each other. Of these ligands, preferred are substituted cyclopentadienyl, indenyl and substituted indenyl.

X represents a σ-bonding ligand. A plurality of X, if any, may be same or different, and may be cross-linked with another X, E$^1$, E$^2$ or Y. Examples of the ligand X include halogen, C$_1$–C$_{20}$ hydrocarbyl, C$_1$–C$_{20}$ alkoxy, C$_6$–C$_{20}$ aryloxy, a C$_1$–C$_{20}$ amide, C$_1$–C$_{20}$ silicon-containing group, C$_1$–C$_{20}$ phosphide, a C$_1$–C$_{20}$ sulfide, C$_1$–C$_{20}$ sulfoxide and C$_1$–C$_{20}$ acyl. Examples of halogen include chlorine, fluorine, bromine and iodine. Examples of C$_1$–C$_{20}$ hydrocarbyl include alkyl such as methyl, ethyl, various propyl, various butyl, various hexyl, cyclohexyl and various octyl; alkenyl such as vinyl, propenyl and cyclohexenyl; arylalkyl such as benzyl, phenylethyl and phenylpropyl; and aryl such as phenyl, tolyl, dimethylphenyl, trimethylphenyl, ethylphenyl, propylphenyl, biphenyl, naphthyl, methylnaphthyl, anthracenyl and phenathryl. Of the above, preferred are alkyl such as methyl, ethyl and various propyl, and aryl such as phenyl. Examples of C$_1$–C$_{20}$ alkoxy include alkoxy such as methoxy, ethoxy, propoxy, and butoxy; phenylmethoxy and phenylethoxy. Examples of C$_6$–C$_{20}$ aryloxy include phenoxy, methylphenoxy and dimethylphenoxy. Examples of C$_1$–C$_{20}$ amido include alkylamido such as dimethylamido, diethylamido, dipropylamido, dibutylamido, dicyclohexylamido and methylethylamido; arylalkylamido such as dibenzylamido, phenylethylamido and phenylpropylamido; alkenylamido such as divinylamido, dipropenylamido and dicyclohexenylamido; arylalkylamido such as dibenzylamido, phenylethylamido and phenylpropylamido; and arylamido such as diphenylamido and dinaphthylamido. Examples of C$_1$–C$_{20}$ silicon-containing group include monohydrocarbylsilyl such as methylsilyl and phenylsilyl; dihydrocarbylsilyl such as dimethylsilyl and diphenylsilyl; trihydrocarbylsilyl such as trimethylsilyl, triethylsilyl, tripropylsilyl, tricyclohexylsilyl, triphenylsilyl, dimethylphenylsilyl, methyldiphenylsilyl, tritolylsilyl and trinaphthylsilyl; hydrocarbylsilyl ether such as trimethylsilyl ether; silicon-substituted alkyl such as trimethylsilylmethyl; and silicon-substituted aryl such as trimethylsilylphenyl. Examples of C$_1$–C$_{20}$ phosphide include alkylphosphide such as methylphosphide, ethylphosphide, propylphosphide, butylphosphide, cyclohexylphosphide, hexylphosphide and octylphosphide; alkenylphosphide such as vinylphosphide, benzylphosphide and propenylphosphide; and aryl phosphide such as phenylphosphide. Examples of C$_1$–C$_{20}$ sulfide include alkylsulfide such as methylsulfide, ethylsulfide, propylsulfide, butylsulfide, hexylsulfide, cyclohexylsulfiede and octylsulfide; alkenylsulfide such as vinylsulfide, propenylsulfide and cyclohexenylsulfide; arylalkylsulfide such as benzylsulfide, phenylethylsulfide and phenylpropylsulfide; and arylsulfide such as phenylsulfide, tolylsulfide, dimethylphenylsulfide, trimethylphenylsulfide, ethylphenylsulfide, propylphenylsulfide, biphenylsulfide, naphthylsulfide, methylnaphthylsulfide, anthracenylsulfide and phenanthrylsulfide. Examples of C$_1$–C$_{20}$ sulfoxide include alkylsulfoxide such as methylsulfoxide, ethylsulfoxide, propylsulfoxide, butylsulfoxide, hexylsulfoxide, cyclohexysulfoxide and octylsulfoxide; alkenylsulfoxide such as vinylsulfoxide, propenylsulfoxide and cyclohexenylsulfoxide; arylalkylsulfoxide such as benzylsulfoxide, phenylethylsulfoxide and phenylpropylsulfoxide; and arylsulfoxide such as phenylsulfoxide, tolylsulfoxide, dimethylphenylsulfoxide, trimethylphenylsulfoxide, ethylphenylsulfoxide, propylphenylsulfoxide, biphenylsulfoxide, naphthylsulfoxide, methylnaphthylsulfoxide, anthracenylsulfoxide and phenathrylsulfoxide. Examples of C$_1$–C$_{20}$ acyl include alkylacyl such as formyl, acetyl, propionyl, butyryl, valeryl, palmitoyl, stearoyl and oleyl; arylacyl such as benzoyl, toluoyl, salicyloyl, cinnamoyl, naphthoyl and phthaloyl; and oxalyl, malonyl and succinyl derived from dicarboxylic acids such as oxalic acid, malonic acid and succinic acid.

Y represents a Lewis base. A plurality of Y, if nay, may be the same or different, and may be cross-linked with another Y, E$^1$, E$^2$ or X. The Lewis base may be amine, ether, phosphine and thioether. The amine may be C$_1$–C$_{20}$ amine exemplified by alkylamines such as methylamine, ethylamine, propylamine, butylamine, cyclohexylamine, methylethylanine, dimethylamine, diethylamine, dipropylamine, dibutylamine, dicyclohexylamine and methylethylamine; alkenylamines such as vinylamine, propenylamine, cyclohexenylamine, divinylamine, dipropenylamine and dicyclohexenylamine; arylalkylamines such as phenylmethylamine, phenylethylamine and phenylpropylamine; and arylamines such as diphenylamine and dinaphthylamine. Examples of the ethers include aliphatic simple ethers such as methyl ether, ethyl ether, propyl ether, isopropyl ether, butyl ether, isobutyl ether, n-amyl ether and isoamyl ether; aliphatic mixed ethers such as methyl ethyl ether, methyl propyl ether, methyl isopropyl ether, methyl n-amyl ether, methyl isoamyl ether, ethyl propyl ether, ethyl isopropyl ether, ethyl butyl ether, ethyl isobutyl ether, ethyl n-amyl ether and ethyl isoamyl ether; aliphatic unsaturated ethers such as vinyl ether, allyl ether, methyl vinyl ether, methyl allyl ether, ethyl vinyl ether and ethyl allyl ether; aromatic ethers such as anisole, phenetole, phenyl ether, benzyl ether, phenyl benzyl ether, α-naphthyl ether and β-naphthyl ether; and cyclic ethers such as ethylene oxide, propylene oxide, trimethylene oxide, tetrahydrofuran, and dioxane. The phosphines may be C$_1$–C$_{20}$ hydrocarbylphosphines, alkenylphosphines, (arylalkyl)

phosphines, arylalkylphosphines and aromatic phosphines. Examples of hydrocarbylphosphines include monohydrocarbylphosphines such as methylphosphine, ethylphosphine, propylphosphine, butylphosphine, hexylphosphine, cyclohexylphosphine and octylphosphine; dihydrocarbylphosphines such as dimethylphosphine, diethylphosphine, dipropylphosphine, dibutylphosphine, dihexylphosphine, dicyclohexylphosphine and dioctylphosphine; and trihydrocarbylphosphines such as trimethylphosphine, triethylphosphine, tripropylphosphine, tributylphosphine, trihexylphosphine, tricyclohexylphosphine and trioctylphosphine. Examples of alkenylphosphines include monoalkenylphosphines such as vinyl phosphine, propenyl phosphine and cyclohexenyl phosphine; dialkenylphosphines in which two hydrogen atoms of phosphine are replaced by alkenyl groups; and trialkenylphosphines in which three hydrogen atoms of phosphine are replaced by alkenyl groups. Examples of (arylalkyl)phosphines include benzylphosphine, (phenylethyl)phosphine and (phenylpropyl)phosphine. Examples of arylalkylphosphines include diarylalkylphosphine and aryldialkylphosphine in which three hydrogen atoms of phosphine are replaced by three of aryl and alkyl. Examples of aromaticphosphines include arylphosphines such as phenylphosphine, tolylphosphine, dimethylphenylphosphine, trimethylphenylphosphine, ethylphenylphosphine, propylphenylphosphine, biphenylphosphine, naphthylphosphine, methylnaphthylphosphine, anthracenyl phosphine and phenathryl phosphine; di(alkylaryl) phosphines in which two hydrogen atoms of phosphine are replaced by alkylaryl groups; and tri(alkylaryl)phosphines in which three hydrogen atoms of phosphine are replaced by alkylaryl groups. As thioethers, the sulfides mentioned above for X may be used.

$A^1$ and $A^2$ are divalent groups for cross-linking two ligands, and may be the same or different from each other. $A^1$ and $A^2$ are each independently $C_1$–$C_{20}$ hydrocarbyl, $C_1$–$C_{20}$ halogen-containing hydrocarbyl, silicon-containing group, germanium-containing group, tin-containing group, —O—, —CO—, —S—, —SO$_2$—, —Se—, —NR—, —PR—, —P(O)R—, —BR— or —AlR— wherein R is hydrogen, halogen, $C_1$–$C_{20}$ hydrocarbyl or $C_1$–$C_{20}$ halogen-containing hydrocarbyl. Examples of the cross-linking groups include ethylene, 1,2-cyclohexylene, dimethylsilylene, diphenylsilylene, methylphenylsilylene, dimethylgermylene, dimethylstannylene, tetramethyldisilylene, diphenyldisilylene and divalent groups represented by the following general formula:

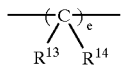

wherein $R^{13}$ and $R^{14}$ may be same or different and each independently is hydrogen or $C_1$–$C_{20}$ hydrocarbyl; $R^{13}$ and $R^{14}$ may be bonded to each other to form a ring; and e is an integer of 1 to 4. Examples of the cross-linking groups represented by the above formula include methylene, ethylidene, propylidene, isopropylidene, cyclohexylidene and vinylidene (CH$_2$=C=). Of these cross-linking groups, preferred are ethylene, isopropylidene and dimethylsilylene. The suffix q is an integer of 1 to 5 given by the formula, [(valence of M)–2], and the suffix r is an integer of 0 to 3.

In the transition metal compounds represented by the general formula (I), when $E^1$ and $E^2$ are substituted cyclopentadienyl, indenyl or substituted indenyl, the cross-linking groups $A^1$ and $A^2$ preferably form (1,2')(2,1') double bridge. Of the transition metal compounds of the general formula (I) having such a structure, preferred are those having, as a ligand, a doubly bridged biscyclopentadienyl derivative represented by the following formula (I-a):

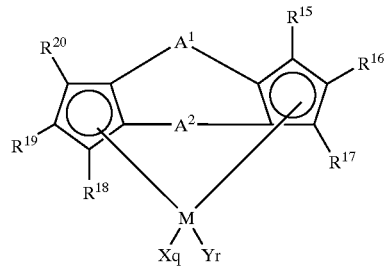

In the formula (I-a), M, $A^1$, $A^2$, q and r are the same as defined above. X is a σ-bonding ligand, and a plurality of X, if any, may be the same or different and may be cross-linked with another X group or Y. Examples of X are the same as exemplified above with respect to X of the general formula (I). Y is a Lewis base, and a plurality of Y, if any, may be the same or different and may be cross-linked with another Y or X. Examples of Y are the same as exemplified above with respect to Y of the general formula (I). $R^{15}$ to $R^{20}$ are each independently hydrogen, halogen, $C_1$–$C_{20}$ hydrocarbyl, $C_1$–$C_{20}$ halogen-containing hydrocarbyl, silicon-containing group or hetero atom-containing group, with the proviso that, at least one of $R^{15}$ to $R^{20}$ is required to be other than hydrogen. $R^{15}$ to $R^{20}$ may be the same or different, and adjacent pair may be bonded to each other to form a ring. In particular, $R^{16}$ and $R^{17}$ as well as $R^{19}$ and $R^{20}$ are preferably bonded to each other to form a ring. More preferably, each pair forms indenyl group together with cyclopentadienyl to which each pair is attached. $R^{15}$ and $R^{18}$ are each preferably a group having a hetero atom such as oxygen, halogen and silicon, because the polymerization activity is enhanced.

The doubly bridged biscyclopentadienyl ligand of the transition metal compound is preferred to be (1,2') (2,1') double bridge.

Examples of the transition metal compounds represented by the general formula (I) include (1,2'-ethylene)(2,1'-ethylene)-bis(indenyl)zirconium dichloride, (1,2'-methylene)(2,1'-methylene)-bis(indenyl)zirconium dichloride, (1,2'-isopropylidene)(2,1'-isopropylidene)-bis(indenyl)zirconium dichloride, (1,2'-ethylene)(2,1'-ethylene)-bis(3-methylindenyl)zirconium dichloride, (1,2'-ethylene)(2,1'-ethylene)-bis(4,5-benzoindenyl)zirconium dichloride, (1,2'-ethylene)(2,1'-ethylene)-bis(4-isopropylindenyl)zirconium dichloride, (1,2'-ethylene)(2,1'-ethylene)-bis(5,6-dimethylindenyl)zirconium dichloride, (1,2'-ethylene)(2,1'-ethylene)-bis(4,7-diisopropylindenyl)zirconium dichloride, (1,2'-ethylene)(2,1'-ethylene)-bis(4-phenylindenyl)zirconium dichloride, (1,2'-ethylene)(2,1'-ethylene)-bis(3-methyl-4-isopropylindenyl)zirconium dichloride, (1,2'-ethylene)(2,1'-ethylene)-bis(5,6-benzoindenyl)zirconium dichloride, (1,2'-ethylene)(2,1'-isopropylidene)-bis(indenyl)zirconium dichloride, (1,2'-methylene)(2,1'-ethylene)-bis(indenyl)zirconium dichloride, (1,2'-methylene)(2,1'-isopropylidene)-bis(indenyl)zirconium dichloride, (1,2'-dimethylsilylene)(2,1'-dimethylsilylene)-bis(indenyl)zirconium dichloride, (1,2'-dimethylsilylene)(2,1'-dimethylsilylene)-bis(3-methylindenyl)zirconium dichloride, (1,2'-dimethylsilylene) (2,1'-dimethylsilylene)-bis(3-n-butylindenyl)zirconium dichloride, (1,2'-dimethylsilylene)(2,1'-dimethylsilylene)-bis(3-isopropylindenyl)zirconium dichloride, (1,2'- dimethylsilylene)(2,1'-dimethylsilylene)-bis(3-trimethylsilylmethylindenyl)zirconium dichloride, (1,2'-dimethylsilylene)(2,1'-dimethylsilylene)-bis(3-phenylindenyl)zirconium dichloride, (1,2'-dimethylsilylene)(2,1'-dimethylsilylene)-bis(4,5-benzoindenyl)zirconium dichloride, (1,2'-dimethylsilylene)(2,1'-dimethylsilylene)-bis(4-isopropylindenyl)zirconium dichloride, (1,2'-dimethylsilylene)(2,1'-dimethylsilylene)-bis(5,6-dimethylindenyl)zirconium dichloride, (1,2'-dimethylsilylene)(2,1'-dimethylsilylene)-bis(4,7-diisopropylindenyl)zirconium dichloride, (1,2'-dimethylsilylene)(2,1'-dimethylsilylene)-bis(4-phenylindenyl)zirconium dichloride, (1,2'-dimethylsilylene)(2,1'-dimethylsilylene)-bis(3-methyl-4-isopropylindenyl)zirconium dichloride, (1,2'-dimethylsilylene)(2,1'-dimethylsilylene)-bis(5,6-benzoindenyl)zirconium dichloride, (1,2'-dimethylsilylene)(2,1'-isopropylidene)-bis(indenyl)zirconium dichloride, (1,2'-dimethylsilylene)(2,1'-isopropylidene)-bis(3-methylindenyl)zirconium dichloride, (1,2'-dimethylsilylene)(2,1'-isopropylidene)-bis(3-isopropylindenyl)zirconium dichloride, (1,2'-dimethylsilylene)(2,1'-isopropylidene)-bis(3-n-butylindenyl)zirconium dichloride, (1,2'-dimethylsilylene)(2,1'-isopropylidene)-bis(3-trimethylsilylmethylindenyl)zirconium dichloride, (1,2'-dimethylsilylene)(2,1'-isopropylidene)-bis(3-trimethylsilylindenyl)zirconium dichloride, (1,2'-dimethylsilylene)(2,1'-isopropylidene)-bis(3-phenylindenyl)zirconium dichloride, (1,2'-dimethylsilylene)(2,1'-methylene)-bis(indenyl)zirconium dichloride, (1,2'-dimethylsilylene)(2,1'-methylene)-bis(3-methylindenyl)zirconium dichloride, (1,2'-dimethylsilylene)(2,1'-methylene)-bis(3-isopropylindenyl)zirconium dichloride, (1,2'-dimethylsilylene)(2,1'-methylene)-bis(3-n-butylindenyl)zirconium dichloride, (1,2'-dimethylsilylene)(2,1'-methylene)-bis(3-trimethylsilylmethylindenyl)zirconium dichloride, (1,2'-dimethylsilylene)(2,1'-methylene)-bis(3-trimethylsilylindenyl)zirconium dichloride, (1,2'-diphenylsilylene)(2,1'-methylene)-bis(indenyl)zirconium dichloride, (1,2'-diphenylsilylene)(2,1'-methylene)-bis(3-methylindenyl)zirconium dichloride, (1,2'-diphenylsilylene)(2,1'-methylene)-bis(3-isopropylindenyl)zirconium dichloride, (1,2'-diphenylsilylene)(2,1'-methylene)-bis(3-n-butylindenyl)zirconium dichloride, (1,2'-diphenylsilylene)(2,1'-methylene)-bis(3-trimethylsilylmethylindenyl)zirconium dichloride, (1,2'-diphenylsilylene)(2,1'-methylene)-bis(3-trimethylsilylindenyl)zirconium dichloride, (1,2'-dimethylsilylene)(2,1'-dimethylsilylene)(3-methylcyclopentadienyl)(3'-methylcyclopentadienyl)zirconium dichloride, (1,2'-dimethylsilylene)(2,1'-isopropylidene)(3-methylcyclopentadienyl(3'-methylcyclopentadienyl)zirconium dichloride, (1,2'-dimethylsilylene)(2,1'-ethylene)(3-methylcyclopentadienyl)(3'-methylcyclopentadienyl)zirconium dichloride, (1,2'-ethylene)(2,1'-methylene)(3-methylcyclopentadienyl)(3'-methylcyclopentadienyl)zirconium dichloride, (1,2'-ethylene)(2,1'-isopropylidene)(3-methylcyclopentadienyl)(3'-methylcyclopentadienyl)zirconium dichloride, (1,2'-methylene)(2,1'-methylene)(3-methylcyclopentadienyl)(3'-methylcyclopentadienyl)zirconium dichloride, (1,2'-methylene)(2,1'-isopropylidene)(3-methylcyclopentadienyl)(3'-methylcyclopentadienyl)zirconium dichloride, (1,2'-isopropylidene)(2,1'-isopropylidene)(3-methylcyclopentadienyl)(3'-methylcyclopentadienyl)zirconium dichloride, (1,2'-dimethylsilylene)(2,1'-dimethylsilylene)(3,4-dimethylcyclopentadienyl)(3',4'-dimethylcyclopentadienyl)zirconium dichloride, (1,2'-dimethylsilylene)(2,1'-isopropylidene)(3,4-dimethylcyclopentadienyl)(3',4'-dimethylcyclopentadienyl)zirconium dichloride, (1,2'-dimethylsilylene)(2,1'-ethylene)(3,4-dimethylcyclopentadienyl)(3',4'-dimethylcyclopentadienyl)zirconium dichloride, (1,2'-ethylene)(2,1'-methylene)(3,4-dimethylcyclopentadienyl)(3',4'-dimethylcyclopentadienyl)zirconium dichloride, (1,2'-ethylene)(2,1'-isopropylidene)(3,4-dimethylcyclopentadienyl)(3',4'-dimethylcyclopentadienyl)zirconium dichloride, (1,2'-methylene)(2,1'-methylene)(3,4-dimethylcyclopentadienyl)(3',4'-dimethylcyclopentadienyl)zirconium dichloride, (1,2'-methylene)(2,1'-isopropylidene)(3,4-dimethylcyclopentadienyl)(3',4'-dimethylcyclopentadienyl)zirconium dichloride, (1,2'-isopropylidene)(2,1'-isopropylidene)(3,4-dimethylcyclopentadienyl)(3',4'-dimethylcyclopentadienyl)zirconium dichloride, (1,2'-dimethylsilylene)(2,1'-dimethylsilylene)(3-methyl-5-ethylcyclopentadienyl)(3'-methyl-5'-ethylcyclopentadienyl)zirconium dichloride, (1,2'-dimethylsilylene)(2,1'-dimethylsilylene)(3-methyl-5-isopropylcyclopentadienyl)(3'-methyl-5'-isopropylcyclopentadienyl)zirconium dichloride, (1,2'-(dimethylsilylene)(2,1'-dimethylsilylene)(3-methyl-5-n-butylcyclopentadienyl)(3'-methyl-5'-n-butylcyclopentadienyl)zirconium dichloride, (1,2'-dimethylsilylene)(2,1'-dimethylsilylene)(3-methyl-5-phenylcyclopentadienyl)(3'-methyl-5'-phenylcyclopentadienyl)zirconium dichloride, (1,2'-dimethylsilylene)(2,1'-isopropylidene)(3-methyl-5-ethylcyclopentadienyl)(3'-methyl-5'-ethylcyclopentadienyl)zirconium dichloride, (1,2'-dimethylsilylene)(2,1'-isopropylidene)(3-methyl-5-isopropylcyclopentadienyl)(3'-methyl-5'-isopropylcyclopentadienyl)zirconium dichloride, (1,2'-dimethylsilylene)(2,1'-isopropylidene)(3-methyl-5-n-butylcyclopentadienyl)(3'-methyl-5'-n-butylcyclopentadienyl)zirconium dichloride, (1,2'-dimethylsilylene)(2,1'-isopropylidene)(3-methyl-5-phenylcyclopentadienyl)(3'-methyl-5'-phenylcyclopentadienyl)zirconium dichloride, (1,2'-dimethylsilylene)(2,1'-ethylene)(3-methyl-5-ethylcyclopentadienyl)(3'-methyl-5'-ethylcyclopentadienyl)zirconium dichloride, (1,2'-dimethylsilylene)(2,1'-ethylene)(3-methyl-5-isopropylcyclopentadienyl)(3'-methyl-5'-isopropylcyclopentadienyl)zirconium dichloride, (1,2'-dimethylsilylene)(2,1'-ethylene)(3-methyl-5-n-butylcyclopentadienyl)(3'-methyl-5'-n-butylcyclopentadienyl)zirconium dichloride, (1,2'-dimethylsilylene)(2,1'-ethylene)(3-methyl-5-phenylcyclopentadienyl)(3'-methyl-5'-phenylcyclopentadienyl)zirconium dichloride, (1,2'-dimethylsilylene)(2,1'-methylene)(3-methyl-5-ethylcyclopentadienyl)(3'-methyl-5'-ethylcyclopentadienyl)zirconium dichloride, (1,2'-dimethylsilylene)(2,1'-methylene)(3-methyl-5-isopropylcyclopentadienyl)(3'-methyl-5'-isopropylcyclopentadienyl)zirconium dichloride, (1,2'-dimethylsilylene)(2,1'-methylene)(3-methyl-5-n-butylcyclopentadienyl)(3'-methyl-5'-n-butylcyclopentadienyl)zirconium dichloride, (1,2'-dimethylsilylene)(2,1'-methylene)(3-methyl-5-phenylcyclopentadienyl)(3'-methyl-5'-phenylcyclopentadienyl)zirconium dichloride, (1,2'-ethylene)(2,1'-methylene)(3-methyl-5-isopropylcyclopentadienyl)(3'-methyl-5'-isopropylcyclopentadienyl)zirconium dichloride, (1,2'-ethylene)(2,1'-isopropylidene)(3-methyl-5-isopropylcyclopentadienyl)(3'-methyl-5'-isopropylcyclopentadienyl)zirconium dichloride, (1,2'- methylene)(2,1'-methylene)(3-methyl-5-isopropylcyclopentadienyl)(3'-methyl-5'-isopropylcyclopentadienyl)zirconium dichloride, (1,2'-methylene)(2,1'-isopropylidene)(3-methyl-5-isopropylcyclopentadienyl)(3'-methyl-5'-isopropylcyclopentadienyl)zirconium dichloride, and compounds obtained by replacing zirconium of the above-described compounds with titanium or hafnium, though not limited thereto. Further, similar compounds containing metal elements belonging to the other Groups or lanthanum series may also be involved in the present invention.

As the component (B-1), any compounds can be used as long as they form ionic complex by reacting with the above transition metal compound (A). Suitable compounds are represented by the following general formulae (III) or (IV):

$$([L^1-R^{21}]^{k+})_a([Z]^-)_b \quad (III)$$

$$([L^2]^{k+})_a([Z]^-)_b \quad (IV)$$

In the formulae (III) and (IV), $L^1$ represents a Lewis base. $[Z]^-$ represents a non-coordinating anion $[Z^1]^-$ or $[Z^2]^-$. $[Z^1]^-$ is an anion comprising an element and a plurality of groups bonded to the element, i.e., $[M^4G^1G^2 \ldots G^f]^-$ wherein $M^4$ is an element belonging to Groups 5 to 15, preferably Groups 13 to 15 of the Periodic Table; $G^1$ to $G^f$ are each hydrogen, halogen, $C_1-C_{20}$ alkyl, $C_2-C_{40}$ dialkylamino, $C_1-C_{20}$ alkoxy, $C_6-C_{20}$ aryl, $C_6-C_{20}$ aryloxy, $C_7-C_{40}$ alkylaryl, $C_7-C_{40}$ arylalkyl, $C_1-C_{20}$ halogen-substituted hydrocarbyl, $C_1-C_{20}$ acylalkoxy, organometalloid or $C_2-C_{20}$ hetero atom-containing hydrocarbyl, and two or more of $G^1$ to $G^f$ may be bonded to each other to form a ring; f is an integer given by the formula, [(valence of central metal $M^4$)+1]. $[Z^2]^-$ is a conjugated base of Brønsted acid having a logarithm of reciprocal of acid dissociation constant (pKa) of −10 or lower, a conjugated base of a combination of the Brønsted acid and a Lewis acid, or a conjugated base of an add generally defined as superstrong acid, and may be coordinated with a Lewis base.

$R^{21}$ is hydrogen, $C_1-C_{20}$ alkyl, $C_6-C_{20}$ aryl, $C_6-C_{20}$ alkylaryl or $C_6-C_{20}$ arylalkyl.

$L^2$ is $M^2$, $R^{22}R^{23}M^3$, $R^{24}{}_3C$ or $R^{25}M^3$ wherein $R^{22}$ and $R^{23}$ are each cyclopentadienyl, substituted cyclopentadienyl, indenyl or fluorenyl; $R^{24}$ is $C_1-C_{20}$ alkyl, aryl, alkylaryl or arylalkyl; $R^{25}$ is a macrocyclic ligand such as tetraphenylporphyrin and phthalocyanine; $M^2$ is an element belonging to Groups 1 to 3, 11 to 13 and 17 of the Periodic Table; and $M^3$ is an element belonging to Groups 7 to 12 of the Periodic Table.

Superscript k represents an ionic valence of $[L^1-R^{21}]$ or $[L^2]$, i.e., an integer of 1 to 3.

Subscript a is an integer of 1 or more satisfying b=k×a.

Examples of $L^1$ include amines such as ammonia, methylamine, aniline, dimethylamine, diethylamine, N-methylaniline, diphenylamine, N,N-dimethylaniline, trimethylamine, triethylamine, tri-n-butylamine, methyldiphenylamine, pyridine, p-bromo-N,N-dimethylaniline and p-nitro-N,N-dimethylaniline; phosphines such as triethylphosphine, triphenylphosphine and diphenylphosphine; thioethers such as tetrahydrothiophene; esters such as ethyl benzoate; and nitriles such as acetonitrile and benzonitrile.

Examples of $R^{21}$ include hydrogen, methyl, ethyl, benzyl, and trityl. Examples of $R^{22}$ and $R^{23}$ include cyclopentadienyl, methylcyclopentadienyl, ethylcyclopentadienyl, and pentamethylcyclopentadienyl. Examples of $R^{24}$ include phenyl, p-tolyl, and p-methoxyphenyl. Examples of $R^{25}$ include tetraphenylporphyrin, phthalocyanine, allyl, and methallyl. Examples of $M^2$ include Li, Na, K, Ag, Cu, Br, I, and $I_3$. Examples of $M^3$ include Mn, Fe, Co, Ni, and Zn.

In $[Z^1]^-$, i.e., $[M^4G^1G^2 \ldots G^f]^-$, examples of $M^4$ include B, Al, Si, P, As, and Sb with B and Al being preferred. Examples of $G^1$ to $G^f$ include dialkylamino such as dimethylamino and diethylamino; alkoxy or aryloxy such as methoxy, ethoxy, n-butoxy and phenoxy; hydrocarbyl such as methyl, ethyl, n-propyl, isopropyl, n-butyl, isobutyl, n-octyl, n-eicosyl, phenyl, p-tolyl, benzyl, 4-t-butylphenyl and 3,5-dimethylphenyl; halogen such as fluorine, chlorine, bromine and iodine; hetero atom-containing hydrocarbyl such as p-fluorophenyl, 3,5-difluorophenyl, pentachlorophenyl, 3,4,5-trifluorophenyl, pentafluorophenyl, 3,5-bis(trifluoromethyl)phenyl and bis(trimethylsilyl)methyl; and organometalloid such as pentamethylantimony, trimethylsilyl, trimethylgermyl, diphenylarsine, dicyclohexylantimony and diphenylboron.

Examples of the non-coordinating anion, i.e., the conjugated base $[Z^2]^-$ of Brønsted acid having a pKa of −10 or lower or the conjugated base of a combination of the Brønsted acid and a Lewis acid include trifluoromethanesulfonic acid anion $[(CF_3SO_3)^-]$, bis(trifluoromethanesulfonyl)methyl anion, bis(trifluoromethanesulfonyl)benzyl anion, bis(trifluoromethanesulfonyl)amide, perchloric acid anion $[(ClO_4)^-]$, trifluoroacetic acid anion $[(CF_3CO_2)^-]$, hexafluoroantimony anion $[(SbF_6)^-]$, fluorosulfonic acid anion $[(FSO_3)^-]$, chlorosulfonic acid anion $[(ClSO_3)^-]$, fluorosulfonic acid anion/antimony pentafluoride $[(FSO_3/SbF_5)^-]$, fluorosulfonic acid anion/arsenic pentafluoride $[(FSO_3/AsF_5)^-]$, and trifluoromethanesulfonic acid anion/antimony pentafluoride $[(CF_3SO_3/SbF_5)^-]$.

Examples of the ionic compound (B-1) capable of forming an ionic complex by reacting with the transition metal compound (A) include triethylammonium tetraphenylborate, tri-n-butylammonium tetraphenylborate, trimethylammonium tetraphenylborate, tetraethylammonium tetraphenylborate, methyl(tri-n-butyl)ammonium tetraphenylborate, benzyl(tri-n-butyl)ammonium tetraphenylborate, dimethyldiphenylammonium tetraphenylborate, triphenyl(methyl)ammonium tetraphenylborate, trimethylanilinium tetraphenylborate, methylpyridinium tetraphenylborate, benzylpyridinium tetraphenylborate, methyl(2-cyanopyridinium) tetraphenylborate, triethylammonium tetrakis(pentafluorophenyl)borate, tri-n-butylammonium tetrakis(pentafluorophenyl)borate, triphenylammonium tetrakis(pentafluorophenyl)borate, tetra-n-butylammonium tetrakis(pentafluorophenyl)borate, tetraethylammonium tetrakis(pentafluorophenyl)borate, benzyl(tri-n-butyl)ammonium tetrakis(pentafluorophenyl)borate, methyldiphenylammonium tetrakis(pentafluorophenyl)borate, triphenyl(methyl)ammonium tetrakis(pentafluorophenyl)borate, methylanilinium tetrakis(pentafluorophenyl)borate, dimethylanilinium tetrakis(pentafluorophenyl)borate, trimethylanilinium tetrakis(pentafluorophenyl)borate, methylpyridinium tetrakis(pentafluorophenyl)borate, benzylpyridinium tetrakis(pentafluorophenyl)borate, methyl(2-cyanopyridinium) tetrakis(pentafluorophenyl)borate, benzyl(2-cyanopyridinium) tetrakis(pentafluorophenyl)borate, methyl(4-cyanopyridinium) tetrakis(pentafluorophenyl)borate, triphenylphosphonium tetrakis(pentafluorophenyl)borate, dimethylanilinium tetrakis[bis(3,5-di-trifluoromethyl)phenyl]borate, ferrocenium tetraphenylborate, silver tetraphenylborate, trityl tetraphenylborate, tetraphenylporphyrin manganese tetraphenylborate, ferrocenium tetrakis(pentafluorophenyl)borate, (1.1'-dimethylferrocenium) tetrakis(pentafluorophenyl)borate, decamethylferrocenium tetrakis(pentafluorophenyl)borate, silver tetrakis(pentafluorophenyl)borate, trityl tetrakis(pentafluorophenyl)borate, lithium tetrakis(pentafluorophenyl)borate, sodium tetrakis(pentafluorophenyl)borate, tetraphenylporphyrin manganese tetrakis(pentafluorophenyl)borate, silver tetrafluoroborate, silver hexafluorophosphate, silver hexafluoroarsenate, silver perchlorate, silver trifluoroacetate, and silver trifluoromethanesulfonate.

These ionic compounds (B-1) which are capable of forming an ionic complex by reacting with the transition metal compound (A) may be used alone or in combination of two or more.

The aluminoxane (B-2) may be a linear aluminoxane represented by the following general formula (V):

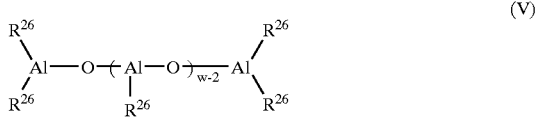

(V)

wherein $R^{26}$ is $C_1$–$C_{20}$, preferably $C_1$–$C_{12}$ hydrocarbyl such as alkyl, alkenyl, aryl and arylalkyl or halogen; w is an average polymerization degree, i.e., an integer of usually 2 to 50, preferably 2 to 40; and $R^{26}$ groups may be the same or different, or a cyclic aluminoxane represented by the following general formula (VI):

(VI)

wherein $R^{26}$ and w are the same as defined above.

The above aluminoxanes may be produced by contacting an alkyl aluminum with a condensing agent such as water. The contact method is not particularly restricted, and may be conducted by any known methods. For example, there may be used:

(1) a method of dissolving an organoaluminum compound in an organic solvent, and then contacting the solution with water;
(2) a method of adding an organoaluminum compound at an initial stage of polymerization, and then adding water at a later stage of polymerization;
(3) a method of reacting crystal water of a metal salt or adsorbed water of an inorganic or organic compound with an organoaluminum compound; and
(4) a method of reacting tetraalkyldialuminoxane with an trialkylaluminum, and then with water. The aluminoxanes may be insoluble to toluene. These aluminoxanes may be used alone or in combination of two or more.

When using the compound (B-1) as the catalyst component (B), the molar ratio of the catalyst component (A) to the catalyst component (B) is preferably 10:1 to 1:100, more preferably 2:1 to 1:10. When out of the above range, the cost performance of the catalyst per unit weight of the polymer is low and therefore not practical. When using the compound (B-2) as the catalyst component (B), the molar ratio of the catalyst component (A) to the catalyst component (B) is preferably 1:1 to 1:1,000,000, more preferably 1:10 to 1:10,000. When out of the above range, the cost performance of the catalyst per unit weight of the polymer is low and therefore not practical. The compounds (B-1) and (B-2) may be used alone or in combination.

The polymerization catalyst used in the present invention may further contain, in addition to the components (A) and (B), an organoaluminum compound as the component (C).

The organoaluminum compound (C) usable in the present invention is represented by the general formula (VII):

$$R^{27}_v AlJ_{3-v} \qquad (VII)$$

wherein $R^{27}$ is $C_1$–$C_{10}$ alkyl; J is hydrogen, $C_1$–$C_{20}$ alkoxy, $C_6$–$C_{20}$ aryl or halogen; v is an integer of 1 to 3.

Examples of the compounds represented by the general formula (VII) include trimethylaluminum, triethylaluminum, triisopropylaluminum, triisobutylaluminum, dimethylaluminum chloride, diethylaluminum chloride, methylaluminum dichloride, ethylaluminum dichloride, dimethylaluminum fluoride, diisobutylaluminum hydride, diethylaluminum hydride, and ethylaluminum sesquichloride. These organoaluminum compounds may be used alone or in combination of two or more.

In the production method of the present invention, the components (A), (B) and (C) may be preliminarily contacted with each other. The preliminary contact may be performed, for example, by contacting the component (B) with the component (A). The contacting method is not particularly restricted and may be conducted by any known method. The preliminary contact is effective to reduce the catalyst cost because the catalytic activity is improved and the use amount of the co-catalyst component (B) is reduced. By contacting the component (A) with the compound (B-2), an effect, in addition to the above effect, of increasing the molecular weight can be obtained. The preliminary contact is usually carried out at −20 to 200° C., preferably −10 to 150° C., more preferably 0 to 80° C. optionally using a solvent such as inert hydrocarbons, aliphatic hydrocarbons and aromatic hydrocarbons with the aliphatic hydrocarbons being preferred.

The molar ratio of the catalyst component (A) to the catalyst component (C) is preferably 1:1 to 1:10,000, more preferably 1:5 to 1:2,000, still more preferably 1:10 to 1:1,000. The component (C) increases the polymerization activity per unit transition metal. However, an excessively large amount is useless and a large amount of the component (C) remains in the polymer.

In the present invention, at least one of the catalyst components may be carried on a suitable support. The catalyst support usable in the present invention may be, but not limited to, inorganic oxide supports, other inorganic supports and organic supports with the inorganic oxide supports and other inorganic supports being preferred.

Examples of inorganic oxides for the catalyst support include $SiO_2$, $Al_2O_3$, MgO, $ZrO_2$, $TiO_2$, $Fe_2O_3$, $B_2O_3$, CaO, ZnO, BaO, $ThO_2$ and mixtures thereof such as silica alumina, zeolite, ferrite and glass fibers with $SiO_2$ and $Al_2O_3$ being particularly preferred. The inorganic oxide supports may contain a small amount of carbonates, nitrates, sulfates, etc.

As the other support, usable is a magnesium compound or its complex salt, such as $MgCl_2$ and $Mg(OC_2H_5)_2$, represented by the general formula:

$$MgR^{28}_x X^1_y$$

wherein $R^{28}$ is $C_1$–$C_{20}$ alkyl, $C_1$–$C_{20}$ alkoxy or $C_6$–$C_{20}$ aryl; $X^1$ is a halogen atom or $C_1$–$C_{20}$ alkyl; x is an integer of 0 to 2, and y is an integer of 0 to 2 with x+y being 2. $R^{28}$ groups or $X^1$ groups may be the same or different, respectively.

Examples of the organic supports include polymers such as polystyrene, styrene-divinylbenzene copolymer, polyethylene, polypropylene, substituted polystyrene and polyarylate, starch, and carbon.

Of the above catalyst supports, preferred are $MgCl_2$, $MgCl(OC_2H_5)$, $Mg(OC_2H_5)_2$, $SiO_2$ and $Al_2O_3$. Although depending upon the type and the production method, the average particle size of the catalyst support is usually 1 to 300 μm, preferably 10 to 200 μm, more preferably 20 to 100 μm. An excessively small particle size of the catalyst support leads to increase in the amount of fine powder in the polymer, and an excessively large particle size leads to increase in the amount of coarse particles in the polymer to reduce the bulk density of the polymer or clog a hopper.

The specific surface area of the catalyst support is usually 1 to 1,000 $m^2/g$, preferably 50 to 500 $m^2/g$, and the pore-volume is usually 0.1 to 5 $cm^3/g$, preferably 0.3 to 3 $cm^3/g$. When the specific surface area or the pore volume is out of the above range, the catalyst activity tends to be lowered. The specific surface area and the pore volume are determined, for example, from a volume of nitrogen gas absorbed according to BET method.

Further, the inorganic oxide support is preferably used after calcined usually at 150 to 1,000° C., preferably 200 to 800° C.

When supporting at least one catalyst component on the catalyst support, at least one, preferably both, of the catalyst components (A) and (B) may be supported thereon. Although the method for supporting at least one of the catalyst components (A) and (B) is not particularly limited, the supporting may be effected, for example, by:

(1) a method of mixing at least one of the components (A) and (B) with the catalyst support;

(2) a method of mixing a catalyst support treated with an organoaluminum compound or a halogen-containing silicon compound with at least one of the components (A) and (B) in an inert solvent;

(3) a method of reacting the catalyst support and the component (A) and/or the component (B) with an organoaluminum compound or a halogen-containing silicon compound;

(4) a method of mixing a catalyst support that supports one of the component (A) and the component (B) with the other component being not supported;

(5) a method of mixing a contact reaction product of the component (A) and the component (B) with the catalyst support; or (6) a method of contacting the component (with the component (B) in the presence of the catalyst support. The methods (4), (5) and (6) may be carried out in the presence of the organoaluminum compound (C).

The catalyst of the present invention may be prepared by irradiating the components (A), (B) and (C) with an elastic wave during the contact treatment. The elastic wave may be a sound wave, preferably an ultrasonic wave having a frequency of 1 to 1,000 kHz, preferably 10 to 500 kHz.

The catalyst thus obtained may be used for the polymerization in as-produced state or in a solid state after distilling off the solvent. Alternatively, in the present invention, the catalyst may be directly prepared in the polymerization system by supporting at least one of the component (A) and the component (B) on the catalyst support therein. For example, catalyst particles can be formed by placing at least one of the component (A) and the component (B), the catalyst support and an optional organoaluminum compound (component (C)) in a reactor, and then, pre-polymerizing an olefin such as ethylene at −20 to 200° C. for about one minute to about two hours under ordinary pressure to 2 MPa.

The weight ratio of the compound (B-1) to the catalyst support is preferably 1:5 to 1:10,000, more preferably 1:10 to 1:500, and the weight ratio of the compound (B-2) to the catalyst support is preferably 1:0.5 to 1:1000, more preferably 1:1 to 1:50. When two or more kinds of the component (B) are used, the weight ratio of each component (B) to the catalyst support preferably lies within the above range. The weight ratio of the component (A) to the catalyst support is preferably 1:5 to 1:10,000, more preferably 1:10 to 1:500.

When the weight ratio of the component (B) (compound (B-1) or compound (B-2)) to the catalyst support or the weight ratio of the component (A) to the catalyst support is out of the above range, the catalytic activity tends to be lowered. The average particle size of the polymerization catalyst thus prepared is usually 2 to 200 μm, preferably 10 to 150 μm, more preferably 20 to 100 μm. The specific surface area is usually 20 to 1,000 $m^2/g$, preferably 50 to 500 $m^2/g$. When the average particle size is less than 2 μm, the amount of fine powder in the polymer tends to be increased. When the average particle size exceeds 200 μm, the amount of coarse particles in the polymer tends to be increased. When the specific surface area is less than 20 $m^2/g$, the catalytic activity tends to be lowered. When the specific surface area exceeds 1,000 $m^2/g$, the bulk density of the polymer tends to be lowered. The amount of the transition metal in the catalyst is usually 0.05 to 10 g, preferably 0,1 to 2 g based on 100 g of the catalyst support. When out of the above range, the catalytic activity tends to be lowered.

The use of the supported catalyst enables the production of industrially useful polymers having an high bulk density and a desired particle size distribution.

(I-3b) Polymerization Catalyst 2

The polymerization catalyst 2 comprises (A) a transition metal compound (II) containing a metal element of Group 4 of the Period Table, (B) and (B) at least one component selected from the group consisting of a compound (B-1) capable of forming an ionic complex by reacting with said transition metal compound (A) or a derivative thereof, and an aluminoxane (B-2).

The transition metal compound (II) is a singly bridged complex represented by the following general formula (II):

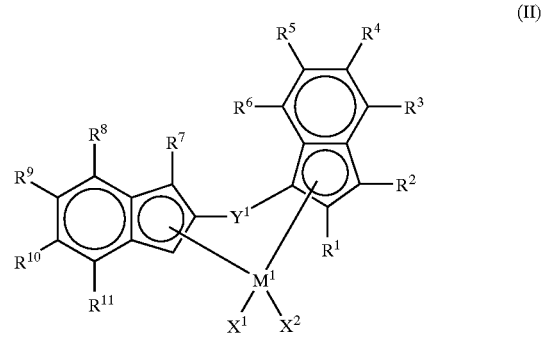

wherein $R^1$ to $R^{11}$, $X^1$ and $X^2$ are each independently hydrogen, halogen, $C_1$–$C_{20}$ hydrocarbyl, halogen-containing $C_1$–$C_{20}$ hydrocarbyl, silicon-containing group, oxygen-containing group, sulfur-containing group, nitrogen-containing group or phosphorus-containing group; and $R^3$ and $R^4$, or $R^8$ and $R^9$ may be bonded to each other to form a ring;

$Y^1$ is divalent group for cross-linking two ligands, and is $C_1$–$C_{20}$ hydrocarbyl, halogen-containing $C_1$–$C_{20}$ hydrocarbyl, silicon-containing group, germanium-containing group, tin-containing group, —O—, —CO—, —S—, —SO$_2$—, —NR—, —PR—, —P(O)R—, —BR— or —AlR— wherein R is hydrogen, halogen, $C_1$–$C_{20}$ hydrocarbyl or halogen-containing $C_1$–$C_{20}$ hydrocarbyl; and $M^1$ is titanium, zirconium or hafnium.

Halogen for $R^1$ to $R^{11}$, $X^1$ and $X^2$ of the formula (II) may include chlorine, fluorine, bromine and iodine. $C_1$–$C_{20}$ Hydrocarbyl may include alkyl such as methyl, ethyl, n-propyl, isopropyl, n-butyl, isobutyl, tert-butyl, n-hexyl and n-decyl; aryl such as phenyl, 1-naphtyl and 2-naphtyl; and aralkyl such as benzyl. Halogen-containing $C_1$–$C_{20}$ hydrocarbyl may include a radical, such as trifluoromethyl, which is derived by replacing at least one hydrogen of $C_1$–$C_{20}$ hydrocarbyl mentioned above with a suitable halogen atom. Silicon-containing group may include trimethylsilyl and dimethyl(tert-butyl)silyl. Oxygen-containing group may include methoxy and ethoxy. Sulfur-containing group may include thiols and sulfonic acid groups, nitrogen-containing group may include dimethylamino, and phosphorus-containing group may include phenyl phosphine. $R^3$ and $R^4$, or $R^8$ and $R^9$ may be bonded to each other to form a ring such as fluorene. $R^1$ is preferably $C_1$–$C_6$ alkyl, more preferably methyl, ethyl, isopropyl or cyclohexyl. Each of $R^3$, $R^6$, $R^8$ and $R^{11}$ is preferably hydrogen or $C_1$–$C_6$ alkyl, more preferably hydrogen, methyl or ethyl. Each of $R^2$, $R^4$, $R^5$, $R^7$, $R^9$ and $R^{10}$ is preferably hydrogen. In particularly preferred combination, $R^1$ is alkyl and $R^7$ is hydrogen. Each of $X^1$ and $X^2$ is preferably halogen, methyl, ethyl or propyl.

Examples of $Y^1$ include methylene, ethylene, ethylidene, isopropylidene, cyclohexylidene, 1,2-cyclohexylene, dimethylsilylene, tetramethyldisilylene, dimethylgermylene, methylborylidene (CH$_3$—B≡), methylalumilidene (CH$_3$—Al≡), phenylphosphylidene (Ph—P≡), phenylphospholidene (Ph—PO≡), 1,2-phenylene, vinylene (—CH═CH—), vinylidene (CH$_2$═C═), methylimide, oxygen (—O—) and sulfur (—S—), with methylene, ethylene, ethylidene and isopropylidene being preferred in view of obtaining the effect of the present invention.

$M^1$ is titanium, zirconium or hafnium with hafnium being preferred.

Examples of the transition metal compounds of the formula (II) include 1,2-ethanediyl(1-(2-isobutylindenyl))(2-indenyl)hafnium dichloride, 1,2-ethanediyl(1-(2-butylindenyl))(2-indenyl)hafnium dichloride, 1,2-ethanediyl (1-(2-butylindenyl))(2-(4,7-dimethylindenyl))hafnium dichloride, 1,2-ethanediyl(1-(2-isopropylindenyl))(2-(4,7-dimethylindenyl))hafnium dichloride, 1,2-ethanediyl(1-(2-isopropylindenyl))(2-(4,7-diisopropylindenyl))hafnium dichloride, dimethylsilylene(1-(2-isobutylindenyl))(2-indenyl)hafnium dichloride, dimethylsilylene(1-(2-butylindenyl))(2-indenyl)hafnium dichloride, dimethylsilylene(1-(2-butylindenyl))(2-(4,7-dimethylindenyl))hafnium dichloride, methylsilylene(1-(2-isopropylindenyl))(2-(4,7-dimethylindenyl))hafnium dichloride, methylsilylene(1-(2-isopropyleindenyl))(2-(4,7-diisopropylindenyl))hafnium dichloride, 1,3-propanediyl(1-(2-isopropylindenyl))(2-indenyl)hafnium dichloride, 1,3-propanediyl(1-(2-isobutylindenyl))(2-indenyl)hafnium dichloride, 1,3-propanediyl(1-(2-butylindenyl))(2-indenyl) hafnium dichloride, 1,3-propanediyl(1-(2-butylindenyl))(2-(4,7-dimethylindenyl))hafnium dichloride, 1,3-propanediyl (1-(2-isopropylindenyl))(2-(4,7-dimethylindenyl))hafnium dichloride, 1,3-propanediyl(1-(2-isopropylindenyl))(2-(4,7-diisopropylindenyl))hafnium dichloride, 1,2-ethanediyl(1-(4,7-diisopropylindenyl))(2-(4,7-diisopropylindenyl)) hafnium dichloride, 1,2-ethanediyl(9-fluorenyl)(2-(4,7-diisopropylindenyl))hafnium dichloride, isopropylidene(1-(4,7-diisopropylindenyl))(2-(4,7-diisopropylindenyl)) hafnium dichloride, 1,2-ethanediyl(1-(4,7-dimethylindenyl))(2-(4,7-diisopropylindenyl))hafnium dichloride, 1,2-ethanediyl(9-fluorenyl)(2-(4,7-dimethylindenyl))hafnium dichloride, isopropylidene(1-(4,7-dimethylindenyl))(2-(4,7-diisopropylindenyl))hafnium dichloride, 1,2-ethanediyl(2-indenyl)(1-(2-isopropylindenyl))hafnium dichloride, dimethylsilylene(2-indenyl)(1-(2-isopropylindenyl))hafnium dichloride, and compounds obtained by replacing hafnium of the above compounds with titanium or zirconium, although not limited thereto.

The transition metal compound represented by the formula (II) is produced by, e.g., the method disclosed in Japanese Patent Application Laid-Open No. 11-130807 of the same assignee. Two or more of the transition metal compounds (II) may be used as the catalyst component (A).

The catalyst component (B) of the polymerization catalyst 2 is the same as in the polymerization catalyst 1. Like the polymerization catalyst 1, the polymerization catalyst 2 may be supported on a carrier, subjected to pre-polymerization, or combinedly used, if desired, with the organoaluminum compound (C) mentioned above.

(I-3c) Polymerization

The propylene polymer (A) and the propylene homopolymer (A-1) may be produced by any polymerization method of, but not particularly restricted, slurry polymerization, vapor-phase polymerization, bulk polymerization, solution polymerization, and suspension polymerization with slurry polymerization and vapor-phase polymerization being preferred. Examples of $C_4$–$C_{20}$ α-olefins include 1-butene, 1-pentene, 4-methyl-1-pentene, 1-hexene, 1-octene, 1-decene, 1-dodecene, 1-tetradecene, 1-hexadecene, 1-octadecene, and 1-eicosene. These α-olefins may be used alone or in combination of two or more.

As to the polymerization conditions, the polymerization temperature is usually −100 to 250° C., preferably −50 to 200° C., more preferably 0 to 130° C. The molar ratio of the starting monomer or monomers to the component (A) is preferably 1 to $10^8$, more preferably 100 to $10^5$. The polymerization time is usually 5 min to 10 h, and the polymerization reaction pressure is preferably from ordinary pressure to 20 MPa, more preferably from ordinary pressure to 10 MPa.

The molecular weight of the polymer may be controlled by appropriately selecting kinds and amounts of the catalyst components and polymerization temperature, or by polymerizing in the presence of a chain transfer agent such as hydrogen; silane compounds such as phenylsilane and phenyldimethylsilane; and organoaluminum compounds such as trimethyl aluminum with hydrogen being preferred. The addition amount of the chain transfer agent is 10 mol or more, preferably 50 mol or more per one mol of the transition metal in the catalyst.

The polymerization may be carried out using a solvent, for example, aromatic hydrocarbons such as benzene, toluene, xylene and ethyl benzene; alicyclic hydrocarbons such as cyclopentane, cyclohexane and methylcyclohexane; aliphatic hydrocarbons such as pentane, hexane, heptane and octane; and halogenated hydrocarbons such as chloroform and dichloromethane. These solvent may be used alone or in combination of two or more. Also, the monomer such as α-olefins may be used as the solvent. In some polymerization methods, polymerization is performed in the absence of a solvent.

Prior to the main polymerization, a pre-polymerization may be conducted using the polymerization catalyst. The pre-polymerization can be carried out, for example, by contacting a small amount of olefins with the solid catalyst component. The contact method is not particularly restricted, and may be any known method. Olefins usable in the pre-polymerization are not particularly restricted, and the same olefins as exemplified above, e.g., ethylene, $C_3$–$C_{20}$ α-olefins or mixtures thereof may be used. The olefin used in the pre-polymerization is preferred to be the same as that to be used in the subsequent main polymerization.

The temperature of the pre-polymerization is usually from −20 to 200° C., preferably from −10 to 130° C., more preferably from 0 to 80° C. The pre-polymerization may be carried out using a solvent such as inert hydrocarbons, aliphatic hydrocarbons, aromatic hydrocarbons and monomers with aliphatic hydrocarbons being preferred. Alternatively, the pre-polymerization may be conducted in the absence of a solvent.

The pre-polymerization conditions are preferably controlled such that the resultant prepolymerization product has an intrinsic viscosity [η] of 0.2 dl/g or higher, preferably 0.5 dl/g or higher when measured at 135° C. in tetralin, and the yield thereof is 1 to 10,000 g, preferably 10 to 1,000 g per 1 mmol of the transition metal in the catalyst.

(I-4) Production of Polypropylene Film

The propylene polymer (A) and propylene homopolymer (A-1) are formed into films having a thickness of usually 10 to 10,000 μm by any suitable molding method of compression molding, extrusion, blow molding, casting, or the like. The film-forming conditions are easily determined by one of those skilled in the art. Films produced by a cast molding are preferred. The surface of film may be treated, if necessary, to increase the surface energy and polarize the surface. The treating method includes, for example, corona discharge treatment, chromic acid treatment, flame treatment, hot-air treatment, ozone irradiation, and ultraviolet irradiation. The surface of film may be roughened, for example, by sandblasting treatment, solvent treatment or the like.

The film may contain, if desired, a nucleating agent, an anti-oxidant, a neutralizer, a slipping agent, an anti-blocking agent, an anti-fogging agent, an anti-static agent, etc.

The nucleating agents and additives used optionally may be dry-blended with the propylene polymer in a Henschel mixer or the like, or may be melt-kneaded with the propylene polymer in a single- or twin-screw extruder, a Banbury mixer or the like. The high-melting polymers may be added to a reactor at once or gradually during the production of the propylene polymer.

The nucleating agent is not particularly limited as far as it can accelerate the nucleation process. Examples of substances having such effect are those capable of facilitating the orientation of molecular chains through the adsorption of the molecular chains. The nucleating agents may be high-melting polymers, carboxylic acids or metal salts thereof, aromatic sulfonic acids or metal salts thereof, organophosphoric acids or metal salts thereof, dibenzylidenesorbitol or derivatives thereof, partial metal salts of rosin acids, inorganic fine particles, imides, amides, quinacridones, quinones, or mixtures thereof.

Examples of the high-melting polymers include polyolefins such as polyethylene and polypropylene; polyvinylcycloalkanes such as polyvinylcyclohexane and polyvinylcyclopentane; syndiotactic polystyrene; poly(3-methylpentene-1); poly(3-methylbutene-1); and polyalkenylsilanes.

Examples of the metal salts include aluminum benzoate, aluminum p-tert-butylbenzoate, sodium adipate, sodium thiophenecarboxylate, and sodium pyrrolecarboxylate.

Examples of the dibenzylidenesorbitol and its derivatives include dibenzylidenesorbitol, 1,3:2,4-bis(o-3,4-dimethylbenzylidene) sorbitol, 1,3:2,4-bis(o-2,4-dimethylbenzylidene)sorbitol, 1,3:2,4-bis(o-4-ethylbenzylidene sorbitol, 1,3:2,4-bis(o-4-chlorobenzylidene sorbitol, and 1,3:2,4-dibenzylidenesorbitol. The dibenzylidenesorbitol or its derivatives are commercially available as Gelol MD and Gelol MD-LM30 (product names) from New Japan Chemical Co., Ltd.

Examples of the partial metal salts of rosin acids include Pinecrystal KM1600, Pinecrystal KM1500 and Pinecrystal KM1300 (product names) available from Arakawa Chemical Industries Ltd.

Examples of the inorganic particles include talc, clay, mica, asbestos, glass fibers, glass flakes, glass beads, calcium silicate, montmorillonite, bentonite, graphite, aluminum powder, alumina, silica, diatomaceous earth, titanium oxide, magnesium oxide, pumice stone powder, pumice balloons, aluminum hydroxide, magnesium hydroxide, basic magnesium carbonate, dolomite, calcium sulfate, potassium titanate, barium sulfate, calcium sulfite, and molybdenum sulfide.

Examples of the amides include adipic acid dianilide and suberic acid dianilide.

These nucleating agents may be used alone or in combination of two or more.

In the present invention, preferably used as the nucleating agents are inorganic fine particles of talc and a metal salt of an organophosphoric acid represented by the following general formula:

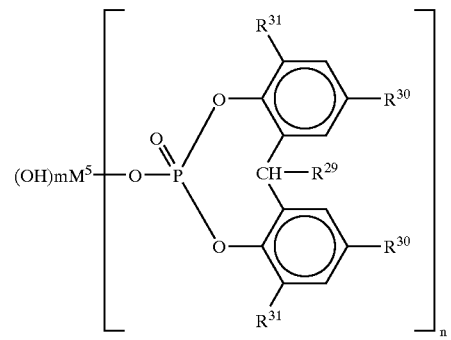

wherein $R^{29}$ is hydrogen or $C_1$–$C_4$ alkyl; $R^{30}$ and $R^{31}$ are each individually hydrogen, $C_1$–$C_{12}$ alkyl, cycloalkyl, aryl or aralkyl; $M^5$ is alkali metal, alkaline earth metal, aluminum or zinc; m is 0 and n is 1 when $M^5$ is alkali metal; n is 1 and m is 1, or n is 2 and m is 0 when $M^5$ is alkaline earth metal or zinc; and m is 1 and n is 2 when $M^5$ is aluminum, because these nucleating agents generate little odor, rendering the films suitable for food applications. The organophosphoric acid metal salt may be available from Asahi Denka Kogyo K.K. under trade names of Adekastab NA-11 and Adekastab NA-21.

The addition amount of the nucleating agent is usually 10 ppm or more, preferably 10 to 10,000 ppm, more preferably 10 to 5,000 ppm, still more preferably 10 to 2,500 ppm based on the propylene polymer (A) or the propylene homopolymer (A-1). When the amount is less than 10 ppm, the processability of the film cannot be improved. The use exceeding 10,000 ppm creates no additional effect.

Films including, as the nucleating agent, the inorganic particles such as talc improve the workability of fabrication such as bag-forming and printing because excellent in slip properties, and are suitable for producing general-purpose packaging films by a high-speed production machine such as various types of automatic filling and packaging laminators. Films including, as the nucleating agent, the dibenzylidenesorbitol or its derivatives are suitable for producing packaging films for toys, stationery, etc. because excellent in transparency and display effect. Films including, as the nucleating agent, the amides are suitable for producing any types of general-purpose packaging films by high-speed bag making machines because capable of preventing defects such as winding wrinkle owing to their excellent rigidity.

The anti-oxidants may be phosphorus anti-oxidants, phenol anti-oxidants and sulfur anti-oxidants.

Examples of the phosphorus anti-oxidants include tris (nonylphenyl) phosphite, tris(2,4-di-tert-butylphenyl) phosphite, distearylpentaerythritol diphosphite, bis(2,4-di-tert-butylphenyl)pentaerythritol phosphite, bis(2,6-di-tert-butyl-4-methylphenyl)pentaerythritol phosphite, 2,2-methylenebis(4,6-di-tert-butylphenyl)octyl phosphite, tetrakis(2,4-di-tert-butylphenyl)-4,4-biphenylene diphosphonite, Adekastab 1178(Asahi Denka Kogyo K.K.), Sumiriser TNP (Sumitomo Chemical Company Ltd.), JP-135 (Johoku Kagaku Co., Ltd.), Adekastab 2112 (Asahi Denka Kogyo K.K.), JPP-2000 (Johoku Kagaku Co., Ltd.), Weston 618 (GE Co., Ltd.), Adekastab PEP-24G (Asahi Denka Kogyo K.K.), Adekastab PEP-36 (Asahi Denka Kogyo K.K.), Adekastab HP-10 (Asahi Denka Kogyo K.K.), Sandstab P-EPQ (Clarient Corp.), and Phosphite 168 (Ciba Specialty Chemicals Co., Ltd.).

Examples of the phenol anti-oxidants include 2,6-di-t-butyl-4-methyl phenol, n-octadecyl-3-(3',5'-di-tert-butyl-4'-hydroxyphenyl) propionate, tetrakis[methylene-3-(3,5-di-tert-butyl-4-hydroxyphenyl) propionate] methane, tris(3,5-di-tert-butyl-4-hydroxybenzyl) isocyanurate, 4,4'-butylidenebis-(3-methyl-6-tert-butyl phenol), triethylene glycol-bis[3-(3-tert-butyl-4-hydroxy-5-methylphenyl) propionate], 3,9-bis{2-[3-(3-tert-butyl-4-hydroxy-5-methylphenyl) propionyloxy]-1,1-dimethylethyl}-2,4,8,10-tetraoxaspiro[5.5] undecane, Sumiriser BHT (Sumitomo Chemical Company Ltd.), Yoshinox BHT (Yoshitomi Seiyaku Co., Ltd.), Antage BHT (Kawaguchi Kagaku Co., Ltd.), Irganox 1076 (Ciba Specialty Chemicals Corp.), Irganox 1010 (Ciba Specialty Chemicals Corp.), Adekastab AO-60 (Asahi Denka Kogyo K.K.), Sumiriser BP-101 (Sumitomo Chemical Company Ltd.), Tominox TT (Yoshitomi Seiyaku Co., Ltd.), TTHP (Toray Industries), Irganox 3114 (Ciba Specialty Chemicals Corp.), Adekastab AO-20 (Asahi Denka Kogyo K.K.), Adekastab AO-40 (Asahi Denka Kogyo K.K.), Sumiriser BBM-S (Sumitomo Chemical Company Ltd.), Yoshinox BB (Yoshitomi Seiyaku Co., Ltd.), Antage W-300 (Kawaguchi Kagaku Co., Ltd.), Irganox 245 (Ciba Specialty Chemicals Corp.), Adekastab AO-70 (Asahi Denka Kogyo K.K.), Tominox 917 (Yoshitomi Seiyaku Co., Ltd.), Adekastab AO-80 (Asahi Denka Kogyo K.K.), and Sumiriser GA-80 (Sumitomo Chemical Company Ltd.).

Examples of the sulfur anti-oxidants include dilauryl-3,3'-thiodipropionate, dimyristyl-3,3'-thiodipropionate, distearyl-3,3'-thiodipropionate, pentaerythritol tetrakis(3-laurylthiopropionate), SUMIRISER TPL (Sumitomo Chemical Company Ltd.), Yoshinox DLTP (Yoshitomi Seiyaku Co., Ltd.), Antiox L (NOF Corporation), Sumiriser TPM (Sumitomo Chemical Company Ltd.), Yoshinox DMTP (Yoshitomi Seiyaku Co., Ltd.), Antiox M (NOF Corporation), Sumiriser TPS (Sumitomo Chemical Company Ltd.), Yoshinox DSTP (Yoshitomi Seiyaku Co., Ltd.), Antiox S (NOF Corporation), Ltd., Adekastab AO-412S (Asahi Denka Kogyo K.K.), Seenox 412S (Sipro Kasei Co., Ltd.), and Sumiriser TDP (Sumitomo Chemical Company Ltd.).

Preferred phenol anti-oxidants are:

Irganox 1010 (pentaerythrityl-tetrakis[3-(3,5-di-tert-butyl-4-hydroxyphenyl) propionate]) available from Ciba Specialty Chemicals Corp.;

Irganox 1076 (octadecyl-3-(3,5-di-tert-butyl-4-hydroxyphenyl) propionate) available from Ciba Specialty Chemicals Corp.;

Irganox 1330 (1,3,5-trimethyl-2,4,6-tris(3,5-di-tert-butyl-4-hydroxybenzyl) benzene) available from Ciba Specialty Chemicals Corp.; and Irganox 3114 (tris(3,5-di-tert-butyl-4-hydroxybenzyl) isocyanurate) available from Ciba Specialty Chemicals Corp.

Preferred phosphorus anti-oxidants are:

Irgaphos 168 (tris(2,4-di-t-butylphenyl) phosphite) available from Ciba Specialty Chemicals Corp.; and P-EPQ (tetrakis(2,4-di-t-butylphenyl)-4,4'-biphenylene diphosphite) available from Clarient Corp.

The amount of the anti-oxidant, when used, is about 0.001 to about 1 part by mass based on 100 parts by mass of the propylene polymer (A) or the propylene homopolymer (A-1). The addition of the anti-oxidant preferably prevents the yellowing, etc. of the polymer.

As the neutralizers, particularly preferred are calcium stearate, zinc stearate, magnesium stearate, hydrotalcite such as DHT-4A (composition: $Mg_{4.5}Al_2(OH)_{13}CO_3 \cdot 3.5H_2O$) available from Kyowa Kagaku Kogyo Co., Ltd., and lithium-aluminum composite hydroxide such as Mizukalac ($[Li_2Al_4(OH)_{12}]CO_3 \cdot mH_2O$ wherein m is ca. 3) available from Mizusawa Kagaku Kogyo Co., Ltd.

As the anti-blocking agents, particularly preferred are a synthetic silica anti-blocling agent "Sailicia" available from Fuji Silysia Co., Ltd., and a synthetic silica anti-blocking agent "Mizukasil" available from Mizusawa Kagaku Kogyo Co., Ltd.

Particularly preferred slipping agents are erucamide, oleamide, stearamide, behenamide, ethylene bisstearamide, ethylene bisoleamide, stearyl erucamide, and oleyl palmitamide.

The addition amount of each additive is about 0.001 to about 1 part by mass based on 100 parts by mass of the propylene polymer (A) or the propylene homopolymer (A-1). Examples of the additive formulation are shown below.

Anti-oxidant
   1000 ppm of Irganox 1010 available from Ciba Specialty Chemicals Corp.
   1000 ppm of Irgaphos 168 available from Ciba Specialty Chemicals Corp.
Neutralizer
   1000 ppm of calcium stearate
Anti-blocking agent
   2300 ppm of a silica anti-blocking agent available from Fuji Silysia Co., Ltd.
Slipping agent
   500 ppm of erucamide (II) Multilayered Polyolefin Resin Laminate The multilayered polyolefin resin laminate of the present invention is a laminate in which at least one outermost layer (hereinafter referred to as "heat-seal layer") is produced from either the propylene polymer (A) or the propylene homopolymer (A-1). The other layers (hereinafter referred to as "intermediate layer" or "laminate layer") may be produced from various polymers other than the propylene polymer (A) and the propylene homopolymer (A-1). Of such various polymers, preferred is a propylene polymer. As the propylene polymer, any propylene polymer having crystallinity (hereinafter referred to as "crystalline propylene polymer") can be used without particular limitation. Examples of the crystalline propylene polymer include propylene homopolymers, propylene-ethylene random copolymers, propylene-ethylene-1-butene random copolymers, and propylene-ethylene block copolymers. The molecular weight of any of the crystalline propylene polymers is determined according to the desired processability. For example, the melt index (at 230° C., 2160 gf) is preferably about 2 to 20 g/10 min for T-die cast film-forming, and preferably about 1 to 10 g/10 min for sheet forming. According to the intended use of films and sheets, a suitable polymer is selected from those having various melt indices. For example, a propylene homopolymer of high melting point and high crystallinity is suitable for the application in which heat resistance and heat seal strength are important. Such a polymer is disclosed in Japanese Patent Application Laid-Open No. 8-85711. The proposed polymer satisfies:

(1) an isotactic pentad fraction P, an index of the stereoregularity, is from 85.0 to 92.0 mol %;
(2) a n-heptane insoluble H is from 93.0 to 97.0% by mass;
(3) P and H satisfy the following formula:

$$0.750P + 27.125 < H; \text{ and further satisfies}$$

(4) a melt index MI (230° C., 2160 gf: the same applies hereinafter) is from 1 to 20 g/10 min; and
(5) the following formula:

$$\tau \leq 0.65 - 0.025 MI$$

wherein $\tau$ is a relaxation time at frequency $\omega_0 = 100$ rad/sec that is measured by a frequency dispersion measurement at 175° C.

Preferred polymer satisfies:
(1) the isotactic pentad fraction P is from 85.0 to 92.0 mol %;
(2) the n-heptane insoluble H is from 86.0 to 97.0% by mass;
(3) P and H satisfy the following formula:

$$0.750P + 26.000 < H; \text{ and}$$

(4) the melt index MI is from 1 to 25 g/10 min; and
(5) the following formula:

$$\tau \leq 0.63 - 0.025 MI$$

wherein $\tau$ is as defined above.

The definitions and measuring methods of P, H, MI, $\omega_0$, and $\tau$, and the production method of the propylene polymer are as described in Japanese Patent Application Laid-Open No. 8-85711.

Further, in order to improve low-temperature heat sealability of the film or sheet, preferably usable are a propylene-ethylene random copolymer, a propylene-ethylene-1-butene random copolymer (hereinafter referred to as "propylene random copolymers") excellent in low-temperature heat sealability, which are disclosed in, e.g., Japanese Patent Application Laid-Open Nos. 9-208629, 9-272718 and 10-130336. The propylene random polymer proposed in Japanese Patent Application Laid-Open No. 9-208629 is a propylene-ethylene random copolymer and satisfies the following requirements (1) to (5):

(1) an ethylene unit content $\chi$ is from 3 to 10% by weight;
(2) a melt index MI is from 4 to 12 g/10 min;
(3) a fraction E (wt %) extractable with boiling diethyl ether and $\chi$ satisfy the following formula (i) or (ii):

$$E \leq 0.25\chi + 1.1 \quad (\chi = 3 \text{ to } 6\% \text{ by weight}) \tag{i}$$

$$E \leq 2.6 \quad (\chi = 6 \text{ to } 10\% \text{ by weight}) \tag{ii};$$

(4) a melting point Tm (° C.) measured by differential scanning calorimeter and $\chi$ satisfy the following formula (iii) or (iv):

$$Tm \leq 140 \quad (\chi = 3 \text{ to } 5\% \text{ by weight}) \tag{iii}$$

$$Tm \leq 165 - 5\chi \quad (\chi = 5 \text{ to } 10\% \text{ by weight}) \tag{iv}; \text{ and}$$

(5) an isotactic triad fraction [mm] of PPP chain is 98.0 mol % or more as measured by $^{13}$C-NMR.

The propylene random polymer proposed in Japanese Patent Application Laid-Open No. 9-272718 is a propylene-ethylene random copolymer and satisfies the following requirements (1) to (5):

(1) an ethylene unit content $\chi$ is from 0.2 to 4% by weight;
(2) a melt index MI is from 4 to 12 g/10 min;
(3) a fraction E (wt %) extractable with boiling diethyl ether and $\chi$ satisfy the following formula (v):

$$E \leq 0.25\chi + 1.1 \tag{v}$$

(4) a melting point Tm (° C.) measured by differential scanning calorimeter and $\chi$ satisfy the following formula (vi);

$$Tm \leq 165 - 5\chi \tag{vi}; \text{ and}$$

(5) an isotactic triad fraction [mm] of PPP chain is 98.0 mol % or more as measured by $^{13}$C-NMR.

The propylene random polymer proposed in Japanese Patent Application Laid-Open No. 11-60639 is a propylene-ethylene-1-butene random copolymer and satisfies the following requirements (1) to (6):

(1) an ethylene unit content $\alpha$ (mol %) and a 1-butene unit content $\beta$ (mol %) satisfy the following formula (vii):

$$4 \leq \alpha + \beta \leq 15 \tag{vii}$$

(2) a melt index MI is from 1 to 12 g/10 min;
(3) a fraction E extractable with boiling diethyl ether and $(\alpha+\beta)$ satisfy the following equation (viii) when $\alpha+\beta \leq 12$, and satisfy the following equation (ix) when $\alpha+\beta > 12$:

$$E \leq 0.2(\alpha+\beta) + 0.6 \tag{viii}$$

$$E \leq 3.0 \tag{ix};$$

(4) a melting point Tm (° C.) measured by differential scanning calorimeter and $(\alpha+\beta)$ satisfy the following formula (x):

$$Tm \leq 164 - 3.6(\alpha+\beta) \tag{x};$$

(5) a stereoregularity index P is 98 mol % or higher as measured by $^{13}$C-NMR; and
(6) a ratio Mw/Mn is 6 or less, wherein Mw is a weight-average molecular weight and Mn is a number-average molecular weight as measured by gel permeation chromatography (GPC).

The definitions and measuring methods of the parameters as well as the production methods of the polymers are as described in the corresponding patent documents. Films and sheet produced from a propylene polymer (crystalline propylene polymer and propylene random copolymer) with no crystallinity tend to be deteriorated in rigidity and heat resistance. In particularly preferred embodiment, the multilayered polyolefin resin laminate of the present invention has at least one, preferably 1 to 3, more preferably 1 to 2 intermediates or laminate layers produced from the crystalline propylene polymer other than the propylene polymers (A) and (A-1).

The intermediate or laminate layer may be produced from a dry blend of the crystalline propylene polymer and the propylene random copolymer prepared using a Henschel mixer or the like, or may be produced from a melt-kneaded mixture prepared using a single- or twin-screw extruder, a Banbury mixer or the like. The mixing ratio of the propylene random copolymer is usually from 1 to 99% by weight, preferably from 10 to 90% by weight, most preferably from 20 to 80% by weight. When the mixing ratio of the propylene random copolymer is less than 1% by weight, the intermediate layer or laminate layer tends to be deteriorated in transparency and impact resistance.

The multilayered polyolefin resin laminate of the present invention may be produced by any suitable production method without particular limitation, for example, by a melt co-extrusion. Particularly, a T-die casting method is preferable because a high-speed forming using a large forming machine is applicable. The high-speed film forming may be conducted under conditions of a take-off speed of about 50 m/min or higher. The thickness of the multilayered laminate is not particularly restricted, and is usually about 10 to 5,000 μm.

The present invention will be described in more detail by reference to the following examples. However, it should be noted that the following examples are only illustrative and not intended to limit the invention thereto.

The resins properties of polymers were evaluated by the following methods.

(1) [η]

The intrinsic viscosity of the polymer was measured at 135° C. in tetralin using an automatic viscometer "VMR-053 Model" available from Rigosha Co., Ltd.

(2) Pentad fraction, triad fraction and abnormal insertion

The peaks of $^{13}$C-NMR spectra obtained under the following conditions were assigned according to the method proposed by A. Zambelli, et al., Macromolecules, 8, 687 (1975).

Apparatus: $^{13}$C-NMR spectrometer "JNM-EX400 Model" manufactured by Nippon Denshi Co., Ltd.
Method: complete proton decoupling method
Concentration: 220 mg/mL
Solvent: 1,2,4-trichlorobenzene/heavy benzene mixed solvent (90/10 by volume)
Temperature: 130° C.
Pulse width: 45°
Pulse interval: 4 s
Integration: 10,000 times (3) Molecular weight distribution (Mw/Mn)

Mw/Mn was calculated from the weight-average molecular weight Mw and the number-average molecular weight Mn which were measured by GPC under the following conditions and calibrated based on polyethylene standard.

GPC Apparatus:
Column: Toso GMHHR-H(S)HT
Detector: RI Detector "WATERS 150C" for liquid chromatogram Measuring conditions:
Solvent: 1,2,4-trichlorobenzene
Measuring temperature: 145° C.
Flow rate: 1.0 mL/min
Sample concentration: 2.2 mg/mL
Injection amount: 160 μL
Calibration curve: Universal Calibration
Analytic program: HT-GPC (Ver. 10)

(4) DSC measurement

A differential scanning calorimeter ("DSC-7" available from Perkin Elmer Co., Ltd.) was used. After melting 10 mg sample by heating at 230° C. for 3 min in nitrogen atmosphere, the sample was cooled to 0° C. at a rate of 10° C./min. The cooed sample was kept at 0° C. for 3 min, and then heated at a temperature rise rate of 10° C./min to obtain a melting endotherm curve. The melting endotherm was expressed as ΔH. The peak top of the maximum peak of the melting endotherm curve was taken as the melting point Tm (° C.).

(5) Temperature programmed chromatography (a) Measuring Method

A sample solution was introduced into a TREF column at 135° C., and then gradually cooled to 0° C. at 5° C./min. The temperature was kept at 0° C. for 30 min to adsorb the sample on the packed adsorbent. The temperature was then raised to 135° C. at 40° C./h to obtain an elution curve. The amount of a fraction eluted in a temperature range of Tp±5° C., wherein Tp is a peak temperature appeared in the elution curve, was determined. In addition, the half-width, Th (° C.), of the peak in the elution curve was measured.

(b) Apparatus

TREF column: silica gel column (4.6 φ×150 mm) available from GL Science Co., Ltd.;
Flow cell: KBr cell with 1-mm optical path available from GL Science Co., Ltd;
Feed Pump: SSC-3100 available from Senshu Kagaku Co., Ltd.;
Valve oven: MODEL 554 (high-temperature type) available from GL Science Co., Ltd.;
TREF oven: available from GL Science Co., Ltd.;
Two-line temperature controller: REX-C100 available from Rigaku Kogyo Co., Ltd;
Detector: IR Detector "MIRAN 1A CVF" for liquid chromatography available from Foxboro Co., Ltd.;
10-Way valve: electric valve available from Balco Co., Ltd; and
Loop: 500 μL loop available from Balco Co., Ltd.

(c) Measuring Conditions

Solvent: o-dichlorobenzene;
Sample concentration: 7.5 g/L;
Injection amount: 500 μL;
Pumping flow: 2.0 mL/min;
Detection wave number: 3.41 μm;
Adsorbent: Chromosorb P (30–60 mesh); and
Column temperature distribution: within ±0.2° C.

(6) Fraction extractable with boiling diethyl ether

The measurement was performed using a Soxhlet extractor under the following conditions.

Sample amount: 1 to 2 g;
Sample form: powder (pulverized into powder, if pellets were used);

Extractant: diethyl ether;
Extraction time: 10 h;
Extraction frequency: 180 times or more; and
Content: Calculated from the following equation:

[extracted amount (g)/charged amount (g)]×100.

Evaluation of Films and Laminates

After producing a laminate and a single-layered film, the laminate and the film were subjected to aging at 40° C. for 24 h and then to conditioning at 23±2° C. and a humidity of 50±10%. The measurements were conducted under the same temperature and humidity conditions.

(1) Tensile modulus and Breaking strength

Determined according to tensile test of JIS K-7127 under the following conditions:

Cross-head speed: 500 mm/min
Load cell: 15 kg
Measuring direction: machine direction (MD direction)

(2) Impact resistance

Evaluated by the impact strength measured using a film impact tester with ½ inch impact head available from Toyo Seiki Seisaku-Sho, Co., Ltd.

(3) Transparency (internal haze)

The haze of a sample with its surface coated with oil was measured according to JIS K-7105. The measured value was taken as the internal haze.

(4) Heat-seal temperature

The heat-seal temperature was measured according to JIS Z-1707. The heat-sealing conditions were shown below. The temperature of the heat seal bar was calibrated by a surface thermometer. The heat-sealed films were left overnight at room temperature, and then, the peel strength was measured by T-peel test at room temperature at a peeling speed of 200 mm/min. The heat-seal temperature was expressed by a temperature at which the peel strength was 2.94 N/15 mm calculated from a seal temperature-peel strength curve.

Sealing time: 2 sec;
Sealing area; 15×10 mm;
Sealing pressure: 0.52 MPa; and
Sealing temperature; measured several times for interpolation.

(5) Slipping properties

A sled having a film thereon was placed on a glass plate having a film thereon. Then, the glass plate was inclined gradually to measure the inclination angle at which the sled started to slide was measured. The slipping properties of the film were determined based on a tangent of the inclination angle. The inclination angle was measured under the following conditions using a friction angle measuring apparatus available from Toyo Seiki Seisaku-Sho Co., Ltd.

Measuring surface: surface opposite to metal-rolled surface (heat-sealed surface)/metal-rolled surface;
Inclination speed: 2.7°/s;
Mass of sled: 1 kg;
Sled sectional area: 65 cm$^2$; and
Contact pressure: 1.5 MPa (Gauge).

(6) Anti-blocking properties

Measuring Method 1

Two films were press-contacted under the following conditions with the metal-rolled surface of one of the films opposing to the non-metal rolled surface of the other. The films were fixedly mounted on a 10 cm×10 cm jig, and the peel strength of 10 cm×10 cm area was measured under the following conditions. Smaller the peel strength, more excellent the anti-blocking properties.

Contact conditions:
Temperature: 60° C.
Period: 7 days
Load: 15 g/cm$^2$
Contact area: 10 cm×10 cm;
Peeling conditions:
Peeling speed: 20 mm/min
Load cell: 2 kg Measuring Method 2

Two laminates were press-contacted under the following conditions with the non-metal rolled surface (heat seal surface) of one of the laminates opposing to the non-metal rolled surface of the other. The films were fixedly mounted on a 10 cm×10 cm jig, and the peel strength of 10 cm×10 cm area was measured under the following conditions. Smaller the peel strength, more excellent the anti-blocking properties.

Contact conditions:
Temperature: 50° C.
Period: 7 days
Load: 15 g/cm$^2$
Contact area: 10 cm×10 cm;
Peeling conditions:
Peeling speed: 20 mm/min
Load cell: 2 kg Measuring Method 3

The same as Measuring method 2 except for press-contacting the non-metal rolled surface (heat seal surface) of one of the laminates with the metal rolled surface (laminate surface) of the other.

(7) Interlaminar strength

The interlaminar strength was rated as "poor" when the heat-seal layer (surface A) was separated from the other layer by pulling with tweezers, and rated as "good" when not separated from the other layer.

SYNTHESIS EXAMPLE 1

Preparation of 1,2-ethanediyl(2-indenyl)(1-(2-isopropylindenyl)) hafnium dichloride Into a 100-mL three-necked flask, were charged 20 mL of THF and 1.69 g (9.9 mmol) of 2-isopropylindenyllithium, and the solution was cooled to −78° C. After adding 1.74 mL (10 mmol) of hexamethylphosphoramide, a solution of 20 mL of THF and 2 g (8.96 mmol) of 1-bromo-2-(2-indenyl) ethane was added dropwise from a dropping funnel. After stirring at room temperature for 8 h, 5 mL of water and then 100 mL of ether were added. The organic phase was washed three times with 50 mL of an aqueous copper sulfate solution using a separatory funnel. The solvent was removed by distillation from the separated organic phase, and the residue was purified on a column using a hexane eluent to obtain 2 g of 1-(2-indenyl)-2-(1-(2-isopropylindenyl))ethane.

Then, into a 200-mL Schlenk tube, were charged 20 mL of diethyl ether and 2 g of 1-(2-indenyl)-2-(1-(2-isopropylindenyl))ethane under nitrogen flow, and the solution was cooled to −78° C. After adding 10 mL of a 1.61 M hexane solution of n-butyl lithium (n-butyl lithium: 16.1 mmol), the mixture was stirred at room temperature for 8 h. Then, the solvent was removed by distillation and the residue was washed with hexane to obtain 2.14 g of a lithium salt of 1-(2-indenyl)-2-(1-(2-isopropylindenyl))ethane.

Then, 10 mL of toluene was added to 1.15 g (3.18 mmol) of the lithium salt and cooled to −78° C. A slurry, cooled to −78° C. in advance, of 1.02 g (3.18 mmol) of hafnium tetrachloride in 10 mL of toluene was added to the lithium salt of 1-(2-indenyl)-2-(1-(2-isopropylindenyl))ethane through a cannula. The mixture was stirred at room temperature for 8 h and filtrated to separate a supernatant. The filtrate was concentrated and then recrystallized from a methylene chloride/hexane mixed solvent to obtain 0.45 g (0.83 mmol) of 1,2-ethanediyl(2-indenyl)(1-(2-isopropylindenyl))hafnium dichloride.

$^1$H-NMR: (δ, ppm): 7.8–7.0 (m, 8H), 6.50 (s, 1H), 5.92 (d, 1H), 3.65 (s, 4H), 3.30 (m, 1H), 1.50 (d, 3H), 1.25 (d, 3H).

EXAMPLE 1

After thoroughly vacuum-drying a 1-L stainless steel pressure autoclave equipped with a stirrer at 80° C., the pressure was returned to atmospheric pressure by nitrogen gas and the autoclave was cooled to room temperature. Into the autoclave, were charged 400 mL of a deoxygenated dry heptane and 0.5 mL of a 2.0 M heptane solution of triisobutylaluminum (1.0 mmol) under dry nitrogen flow, and the mixture was stirred for a while at 350 rpm. Separately, into a 50-mL Schlenk tube having fully purged with nitrogen, were charged 10 mL of toluene and 0.5 mL of a 2 M heptane solution of triisobutylaluminum (1.0 mmol), 1.0 mL of a 2.0 M toluene solution of methylaluminoxane (MAO) (2.0 mmol) and 0.2 mL of a 10 μmol/mL heptane slurry of 1,2-ethanediyl(2-indenyl)(1-(2-isopropylindenyl))hafnium dichloride (2.0 μmol), and the mixture was stirred at room temperature for 3 min. The catalyst slurry thus prepared was rapidly charged into the autoclave, and then the stirring of the mixture was initiated at 1,200 rpm. Then, propylene was introduced into the autoclave to slowly increase the total pressure to 0.8 MPa (Gauge), and at the same time, the temperature was slowly raised to 50° C. The polymerization was continued for 60 min. After completion of the polymerization, the remaining propylene was released, and the reaction mixture was poured into 2 L of methanol to precipitate polypropylene, which was then filtrated and dried to obtain polypropylene.

The resin properties of the polypropylene were examined by the above evaluation methods. After compounding the following additives, the propylene homopolymer was extruded into pellets through a single-screw extruder "TLC 35-20 Model" available from Tsukada Juki Seisakusho Co., Ltd.

Additive formulation

Anti-oxidant:

Irganox 1010 available from Ciba Specialty Chemicals Corp.: 1,000 ppm

Irgaphos 168 available from Ciba Specialty Chemicals Corp.: 1,000 ppm

Neutralizer:

Calcium stearate: 1,000 ppm

Anti-blocking agent:

silica-based anti-blocking agent: 2,300 ppm

Slipping agent:

Erucamide: 2,500 ppm

The pellets were formed into film of a thickness of 50 μm by using a film-forming machine "TLC35-20 Model" (20 mmφ) available from Tsukada Juki Seisakusho Co., Ltd under the following conditions:

T-die outlet temperature: 190° C.

Take-off speed: 6.0 m/min

Chill roll temperature: 30° C.

Chill roll: mirror surface

The film was measured by the above evaluation methods for films and laminates. The results are shown in Table 1.

COMPARATIVE EXAMPLE 1

The procedures of Example 1 were repeated except for using polypropylene F744NP (available from Idemitsu Petrochemical Co., Ltd.) which was produced by using a non-metallocene catalyst (Ti/Mg catalyst). The results are shown in Table 1.

EXAMPLE 2

A multilayered laminate forming machine equipped with a feed block type T-die was used for forming resin into laminates. The feed block type T-die was provided with a T-die available from Koshin Engineering Co., Ltd., a feed block available from Tawaraya Tekkosho Co., Ltd., an extruder "EX40 Model" available from Placo. Co., Ltd. (No. 1), an extruder "VS30-26 Model" available from Tanabe Plastics Machinery Co., Ltd. (No. 2), and an extruder "RT-3-30 Model" available from Rikua Co., Ltd. (No. 3). By extruding the polypropylene prepared in Example 1 from the extruder No. 1, and E-105-GM (polypropylene available for Idemitsu Petrochemical Co., Ltd.) from the extruders Nos. 2 and 3, a laminate having an overall thickness of 30 μm with a thickness ratio of polypropylene layer/E-105GM layer=1/2. The resin extruded from the extruder No. 2 was divided into two layers so as to produce a laminate having a 3-resin, 4-layered structure of No. 1/No. 2/No. 3/No. 2 in the order from the opposite side of the first chill-rolled surface. The resin temperature at the feed block and the T-die outlet was 230° C.; the chill roll temperature was 30° C.; and the take-off speed was 25 m/min. The laminate was examined by the above evaluation methods for laminates. The results are shown in Table 2.

COMPARATIVE EXAMPLE 2

(1) Preparation of Magnesium Compound

A 6-L glass reactor equipped with a stirrer was fully purged with nitrogen gas, and then charged with about 2,430 g of ethanol, 16 g of iodine and 160 g of metallic magnesium. The mixture was heated under stirring and the reaction was continued under reflux until the generation of hydrogen gas was no longer noticed, thereby obtaining a solid product. The reaction liquid containing the solid product was dried under reduced pressure to obtain a magnesium compound.

(2) Preparation of Solid Catalyst Component (A)

Into a 5-L glass reactor having been fully purged with nitrogen gas, were charged 160 g of the magnesium compound (not ground) prepared above, 80 mL of purified heptane, 24 mL of silicon tetrachloride, and 23 mL of diethyl phthalate. Then, 770 mL of titanium tetrachloride was added to the mixture with stirring while keeping the mixture at 80° C., and the reaction was allowed to proceed at 110° C. for 2 h. The resulting solid component was separated and washed with purified heptane at 90° C. The reaction was further allowed to proceed by adding 1,220 mL of titanium tetrachloride at 110° C. for 2 h. The product was fully washed with purified heptane to obtain a solid catalyst component (A).

(3) Gas-phase Polymerization of Propylene

The polymerization was conducted at 70° C. and 28 kg/cm$^2$G by feeding into a 200-L polymerization reactor the solid catalyst component prepared in Step 2 at a rate of 6.0 g/h, triisobutylaluminum (TIBA) at a rate of 0.2 mol/h, 1-allyl-3,4-dimethoxybenzene (ADMB) at a rate of 0.012 mol/h, cyclohexylmethyldimethoxysilane (CHMDMS) at a rate of 0.18 mol/h, and propylene at a rate of 37 kg/h.

(4) Blending and Kneading

The polypropylene thus obtained was blended with 2,5-dimethyl-2,5-di-(tert-butylperoxy)hexane, and then with the same additives as in Example 1. The resulting blend was extruded from a 40-mmϕ extruder into pellets. A monolayered film made from the pellets was evaluated in the same manner as in Example 1. The results are shown in Table 1. Further, a laminate was produced and evaluated in the same manner as in Example 2. The results are shown in Table 2.

TABLE 1

|  | Example | Comparative Examples | |
| --- | --- | --- | --- |
|  | 1 | 1 | 2 |
| Resin Properties | | | |
| [η] (dl/g) | 1.7 | 1.7 | 1.9 |
| [mmmm] (mol %) | 78.0 | — | 72.1 |
| [rrrr] (mol %) | 0.4 | — | 6.1 |
| [rrrr]/(i − [mmmm]) | 0.018 | — | 0.22 |
| 2,1-Insertion (mol %) | 0 | — | 0 |
| 1,3-Insertion (mol %) | 0.3 | — | 0 |
| Mw/Mn | 2.2 | 4.3 | 2.6 |
| Tm (° C.) | 130 | 134 | 160 |
| ΔH (J/g) | 92 | 81 | 79 |
| 0.45 × Tm + 22 | 80.5 | 82.3 | 94 |
| Th (° C.) | 3.4 | 17 | 7.7 |
| Boiling ether extract (wt %) | 0.2 | 2.0 | 12 |
| Properties of Single-Layered Film | | | |
| Tensile Modulus TM (MPa) | 832 | 655 | 514 |
| Impact Resistance (½ inch) (J/m²) | 17000 | 16000 | 20000 |
| Internal Haze (%) | 1.3 | 1.8 | 16 |
| Heat-seal temperature HST (° C.) | 125 | 130 | 160 |
| 12.5 × HST-900 | 662.5 | 725 | 1100 |
| Anti-blocking properties (N/m²) by measuring method 1 | 19 | 63 | — |

TABLE 2

|  | Example 2 | Comparative Example 2 |
| --- | --- | --- |
| Properties of laminate | | |
| Internal haze (%) | 5.3 | 8.4 |
| Tensile modulus TM (MPa) | 1140 | 1070 |
| Slipping properties | 0.30 | 0.42 |
| Anti-blocking properties (N/m²) by measuring method 2 | 16 | 45 |
| Anti-blocking properties (N/m²) by measuring method 3 | 9 | 23 |
| Heat seal temperature HST (° C.) | 127 | 148 |
| Interlaminar strength | good | poor |

Industrial Applicability

The polypropylene film of the present invention is well-balanced between the tensile modulus and the heat seal temperature, less tacky, and excellent in the processability, the transparency and the impact resistance, and is therefore suitably used in, e.g., food packaging and medical fields. The multilayered polyolefin resin laminate of the present invention is also well-balanced between the tensile modulus and the heat seal temperature, less tacky and excellent in the slipping and anti-blocking properties necessary for high-speed bag forming, and is therefore suitably used in, e.g., food packaging and medical fields.

What is claimed is:

1. A polypropylene film, comprising:
    a propylene homopolymer (A-1) having
        (1) a meso pentad fraction [mmmm] of from 70 to 78 mol %; and
        (2) a racemic pentad fraction [rrr] satisfying the following formula:

$$[rrr]/(1-[mmmm])<0.1;$$

wherein said polypropylene film satisfies the following formula:

$$TM \geq 12.5 \times HST-800, \text{ and}$$

wherein $HST \leq 130$,
        wherein TM is a tensile modulus in (MPa) and HST is a heat seal temperature in (° C.).
2. The polypropylene film according to claim 1, having:
    (1) a melting point Tm of from 120 to 135° C. as measured by differential scanning calorimeter (DSC);
    (2) a melting endotherm ΔH (J/g) as measured by the DSC, satisfying the following formula:

$$\Delta H \geq 0.45 \times Tm + 22;$$

(3) a peak top half-width Th of 5° C. or lower when measured on an elution curve by temperature rising fractionation; and
    (4) an intrinsic viscosity [η] of from 1 to 3 dl/g as measured at 135° C. in tetralin.
3. The polypropylene film according to claim 2, wherein the propylene homopolymer (A-1) is produced by polymerizing propylene, or polymerizing propylene with ethylene and/or $C_4$–$C_{20}$ α-olefin, in the presence of a polymerization catalyst comprising:
    (A) a transition metal compound represented by the following general formula (I):

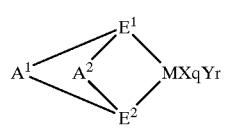

wherein M is a metal element of Groups 3 to 10 or lanthanum series of the Period Table;
    $E^1$ and $E^2$ are the same or different and each independently is a ligand selected from the group consisting of substituted cyclopentadienyl, indenyl, substituted indenyl, heterocyclopentadienyl, substituted heterocyclopentadienyl, amido, phosphide, hydrocarbyl and silicon-containing group and $E^1$ and $E^2$ are cross-linked via $A^1$ and $A^2$;
    X is a σ-bonding ligand; and a plurality of X, if any, may be same or different and each X may be cross-linked with another X, $E^1$, $E^2$ or Y;
    Y is a Lewis base; and a plurality of Y, if any, may be same or different and each Y may be cross-linked with another Y, $E^1$, $E^2$ or X;
    $A^1$ and $A^2$ may be the same or different divalent group for cross-linking two ligands $E^1$ and $E^2$ and each independently is $C_1$–$C_{20}$ hydrocarbyl, $C_1$–$C_{20}$ halogen-containing hydrocarbyl, silicon-containing group, germanium-containing group, tin-containing group, —O—, —CO—, —S—, —SO$_2$—, —Se—, —NR—, —PR—, —P(O)R—, —BR— or —AlR— wherein R is hydrogen, halogen, $C_1$–$C_{20}$ hydrocarbyl or $C_1$–$C_{20}$ halogen-containing hydrocarbyl;
    q is an integer of 1 to 5 given by the formula, [(valence of M)−2]; and r is an integer of 0 to 3, and (B) at least one component selected from the group consisting of a compound (B-1) capable of forming an ionic complex by reacting with the transition metal compound (A) or a derivative thereof, and an aluminoxane (B-2).

4. The polypropylene film according to claim 2, wherein the propylene homopolymer (A-1) is produced by polymerizing propylene, or polymerizing propylene with ethylene and/or $C_4$–$C_{20}$ α-olefin, in the presence of a polymerization catalyst comprising:

(A) a transition metal compound represented by the following general formula (II):

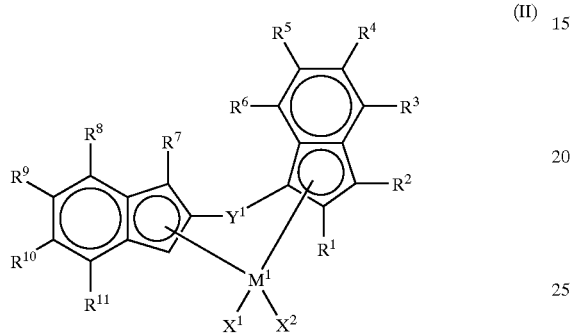

(II)

wherein $R^1$ to $R^{11}$, $X^1$ and $X^2$ are each independently hydrogen, halogen, $C_1$–$C_{20}$ hydrocarbyl, halogen-containing $C_1$–$C_{20}$ hydrocarbyl, silicon-containing group, oxygen-containing group, sulfur-containing group, nitrogen-containing group or phosphorus-containing group; and $R^3$ and $R^4$, or $R^8$ and $R^9$ may be bonded to each other to form a ring;

$Y^1$ is divalent group for cross-linking two ligands, and is $C_1$–$C_{20}$ hydrocarbyl, halogen-containing $C_1$–$C_{20}$ hydrocarbyl, silicon-containing group, germanium-containing group, tin-containing group, —O—, —CO—, —S—, —SO$_2$—, —NR—, —PR—, —P(O)R—, —BR— or —AlR— wherein R is hydrogen, halogen, $C_1$–$C_{20}$ hydrocarbyl or halogen-containing $C_1$–$C_{20}$ hydrocarbyl; and $M^1$ is titanium, zirconium or hafnium; and (B) at least one component selected from the group consisting of a compound (B-1) capable of forming an ionic complex by reacting with the transition metal compound (A) or a derivative thereof, and an aluminoxane (B-2).

5. The polypropylene film according to claim 1, having an internal haze of 5% or less.

6. The polypropylene film according to claim 1, wherein the polypropylene film is a cast film.

7. A multilayered polyolefin resin laminate, comprising at least one outermost layer made of the polypropylene film as defined claim 1.

8. The multilayered polyolefin resin laminate according to claim 7, comprising at least one layer which comprises a crystalline propylene polymer other than the propylene homopolymer (A-1).

9. The multilayered polyolefin resin laminate according to claim 8, wherein said crystalline propylene polymer satisfies:

(1) an isotactic pentad fraction P is from 85 to 92 mol %;

(2) a heptane insoluble H is from 93 to 97% by mass, (3) P and H satisfy the following formula:

0.750P+27.125<H, (4) a melt index MI at 230° C. and 2160 gf is from 1 to 20 g/10 min, and (5) $\tau \leq 0.65-0.0025MI$, wherein τ is a relaxation time at frequency $\omega_0=100$ rad/sec that is measured by a frequency dispersion measurement at 175° C.

10. The multilayered polyolefin resin laminate according to claim 8, comprising a propylene-ethylene random copolymer, or a propylene-ethylene-1-butene random copolymer.

11. The multilayered polyolefin resin laminate according to claim 7, wherein the laminate is produced by coextrusion.

12. The multilayered polyolefin resin laminate according to claim 7, wherein the laminate is produced by casting.

13. The polypropylene film according to claim 1, wherein said polypropylene film satisfies: TM≧12.5×HST−750.

14. The polypropylene film according to claim 1, wherein said propylene homopolymer (A-1) shows substantially no peak attributable to a molecular chain derived from the 2,1-insertion (n-butyl) when measured by $^{13}$C-NMR.

15. The polypropylene film according to claim 1, having a thickness of from 10- to 10,000 μm.

16. The polypropylene film according to claim 1, containing a member selected from the group consisting of a nucleating agent, an anti-oxidant, a neutralizer, a slipping agent, an anti-blocking agent, an anti-fogging agent, an antistatic agent and mixtures thereof.

17. The polypropylene film according to claim 1, comprising an inorganic particle.

18. The polypropylene film according to claim 1, comprising dibenzylidenesorbitol or its derivatives.

19. The polypropylene film according to claim 1, comprising an amide.

* * * * *

UNITED STATES PATENT AND TRADEMARK OFFICE
CERTIFICATE OF CORRECTION

PATENT NO. : 6,770,355 B1
DATED : August 3, 2004
INVENTOR(S) : Minami et al.

It is certified that error appears in the above-identified patent and that said Letters Patent is hereby corrected as shown below:

<u>Title page</u>,
Item [87], should read:
-- [87]  PCT Pub. No.: WO01/30890
         PCT Pub. Date: May 3, 2001 --

Items [45] and [*] Notice, should read as follows:
-- [45] **Date of Patent: *Aug. 3, 2004**

[*] Notice: Subject to any disclaimer, the term of this
              patent is extended or adjusted under 35
              U.S.C. 154(b) by 15 days.

This patent is subject to a terminal disclaimer. --

Signed and Sealed this

Twenty-second Day of February, 2005

JON W. DUDAS
*Director of the United States Patent and Trademark Office*